(12) United States Patent
Mazyar et al.

(10) Patent No.: US 10,092,953 B2
(45) Date of Patent: *Oct. 9, 2018

(54) METHOD OF CONTROLLING THE CORROSION RATE OF ALLOY PARTICLES, ALLOY PARTICLE WITH CONTROLLED CORROSION RATE, AND ARTICLES COMPRISING THE PARTICLE

(71) Applicants: Oleg A. Mazyar, Houston, TX (US);
Michael H. Johnson, Katy, TX (US);
Randall V. Guest, Spring, TX (US);
Nicholas Carrejo, Katy, TX (US);
Wayne R. Furlan, Cypress, TX (US);
Sean L. Gaudette, Katy, TX (US);
Zhiyue Xu, Cypress, TX (US)

(72) Inventors: Oleg A. Mazyar, Houston, TX (US);
Michael H. Johnson, Katy, TX (US);
Randall V. Guest, Spring, TX (US);
Nicholas Carrejo, Katy, TX (US);
Wayne R. Furlan, Cypress, TX (US);
Sean L. Gaudette, Katy, TX (US);
Zhiyue Xu, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 129 days.

This patent is subject to a terminal disclaimer.

(21) Appl. No.: 15/063,605

(22) Filed: Mar. 8, 2016

(65) Prior Publication Data

US 2016/0207106 A1    Jul. 21, 2016

Related U.S. Application Data

(60) Continuation of application No. 13/779,856, filed on Feb. 28, 2013, which is a division of application No. 13/194,271, filed on Jul. 29, 2011, now Pat. No. 9,643,250.

(51) Int. Cl.
| | |
|---|---|
| *C09K 8/54* | (2006.01) |
| *B22F 3/02* | (2006.01) |
| *B05D 5/00* | (2006.01) |
| *B22F 1/02* | (2006.01) |
| *C22C 23/02* | (2006.01) |
| *C23C 30/00* | (2006.01) |
| *C25D 3/42* | (2006.01) |

(52) U.S. Cl.
CPC ............... *B22F 3/02* (2013.01); *B05D 5/00* (2013.01); *B22F 1/025* (2013.01); *C09K 8/54* (2013.01); *C22C 23/02* (2013.01); *C23C 30/00* (2013.01); *C25D 3/42* (2013.01); *B22F 2301/052* (2013.01); *B22F 2301/058* (2013.01); *B22F 2998/10* (2013.01)

(58) Field of Classification Search
CPC ............. C09K 19/56; C09K 2019/0448; C09K 2019/2078; C09K 11/06; C09K 19/2007; C09K 19/3475; C09K 19/588; C09K 2019/0429; C09K 2208/32; C09K 2211/1088; C09K 2219/03; C09K 8/54; C09K 2211/1007; C09K 2211/1059; C09K 2211/185; C09K 5/08; E21B 33/12; E21B 43/26

See application file for complete search history.

(56) References Cited

U.S. PATENT DOCUMENTS

| | | | |
|---|---|---|---|
| 1,468,905 | A | 9/1923 | Herman |
| 2,189,697 | A | 2/1940 | Baker |
| 2,222,233 | A | 11/1940 | Mize |
| 2,225,143 | A | 12/1940 | Baker et al. |
| 2,238,895 | A | 4/1941 | Gage |
| 2,261,292 | A | 11/1941 | Salnikov |
| 2,294,648 | A | 9/1942 | Ansel |
| 2,301,624 | A | 11/1942 | Holt |
| 2,352,993 | A | 7/1944 | Albertson |
| 2,394,843 | A | 2/1946 | Cooke et al. |
| 2,672,199 | A | 3/1954 | McKenna |
| 2,753,941 | A | 7/1956 | Hebard et al. |
| 2,754,910 | A | 7/1956 | Derrick et al. |
| 2,933,136 | A | 4/1960 | Ayers et al. |
| 2,983,634 | A | 5/1961 | Budinkas et al. |
| 3,057,405 | A | 10/1962 | Mallinger |
| 3,066,391 | A | 12/1962 | Vordahl |
| 3,106,959 | A | 10/1963 | Huitt et al. |
| 3,142,338 | A | 7/1964 | Brown |
| 3,152,009 | A | 10/1964 | Delong |
| 3,196,949 | A | 7/1965 | Thomas |
| 3,242,988 | A | 3/1966 | McGuire et al. |
| 3,316,748 | A | 5/1967 | Lang et al. |
| 3,326,291 | A | 6/1967 | Zandmer et al. |
| 3,343,537 | A | 9/1967 | Graham |
| 3,347,317 | A | 10/1967 | Zandemer |
| 3,347,714 | A | 10/1967 | Broverman et al. |

(Continued)

FOREIGN PATENT DOCUMENTS

| | | |
|---|---|---|
| CA | 2783241 A1 | 6/2011 |
| CA | 2783346 A1 | 6/2011 |

(Continued)

OTHER PUBLICATIONS

T.J. Bastow, S. Celotto, Clustering and formation of nano-precipitates in dilute aluminum and magnesium alloys, Materials science and Engineering, 2003, C23, 757-762.*

(Continued)

*Primary Examiner* — Kumar R Bhushan
(74) *Attorney, Agent, or Firm* — Cantor Colburn LLP

(57) ABSTRACT

A composite particle comprises a core, a shielding layer deposited on the core, and further comprising an interlayer region formed at an interface of the shielding layer and the core, the interlayer region having a reactivity less than that of the core, and the shielding layer having a reactivity less than that of the interlayer region, a metallic layer not identical to the shielding layer and deposited on the shielding layer, the metallic layer having a reactivity less than that of the core, and optionally, an adhesion metal layer deposited on the metallic layer.

19 Claims, 3 Drawing Sheets

(56) References Cited

U.S. PATENT DOCUMENTS

| | | |
|---|---|---|
| 3,390,724 A | 7/1968 | Caldwell |
| 3,395,758 A | 8/1968 | Kelly et al. |
| 3,406,101 A * | 10/1968 | Kilpatrick .............. G01N 17/02 204/404 |
| 3,416,918 A | 12/1968 | Henry |
| 3,465,181 A | 9/1969 | Colby et al. |
| 3,489,218 A | 1/1970 | Means |
| 3,513,230 A | 5/1970 | Rhees et al. |
| 3,602,305 A | 8/1971 | Kisling |
| 3,637,446 A | 1/1972 | Elliott et al. |
| 3,645,331 A | 2/1972 | Maurer et al. |
| 3,660,049 A | 5/1972 | Benjamin |
| 3,765,484 A | 10/1973 | Hamby, Jr. et al. |
| 3,768,563 A | 10/1973 | Blount |
| 3,775,823 A | 12/1973 | Adolph et al. |
| 3,816,080 A | 6/1974 | Bomford et al. |
| 3,878,889 A | 4/1975 | Seabourn |
| 3,894,850 A | 7/1975 | Kovalchuk et al. |
| 3,924,677 A | 12/1975 | Prenner et al. |
| 4,010,583 A | 3/1977 | Highberg |
| 4,039,717 A | 8/1977 | Titus |
| 4,050,529 A | 9/1977 | Tagirov et al. |
| 4,157,732 A | 6/1979 | Fonner |
| 4,248,307 A | 2/1981 | Silberman et al. |
| 4,284,137 A | 8/1981 | Taylor |
| 4,292,377 A | 9/1981 | Petersen et al. |
| 4,372,384 A | 2/1983 | Kinney |
| 4,373,584 A | 2/1983 | Silberman et al. |
| 4,373,952 A | 2/1983 | Parent |
| 4,374,543 A | 2/1983 | Richardson |
| 4,384,616 A | 5/1983 | Dellinger |
| 4,395,440 A | 7/1983 | Abe et al. |
| 4,399,871 A | 8/1983 | Adkins et al. |
| 4,407,368 A | 10/1983 | Erbstoesser |
| 4,422,508 A | 12/1983 | Rutledge, Jr. et al. |
| 4,452,311 A | 6/1984 | Speegle et al. |
| 4,475,729 A | 10/1984 | Costigan |
| 4,498,543 A | 2/1985 | Pye et al. |
| 4,499,048 A | 2/1985 | Hanejko |
| 4,499,049 A | 2/1985 | Hanejko |
| 4,524,825 A | 6/1985 | Fore |
| 4,526,840 A | 7/1985 | Jerabek |
| 4,534,414 A | 8/1985 | Pringle |
| 4,539,175 A | 9/1985 | Lichti et al. |
| 4,554,986 A | 11/1985 | Jones |
| 4,619,699 A | 10/1986 | Petkovic-Luton et al. |
| 4,640,354 A | 2/1987 | Boisson |
| 4,664,962 A | 5/1987 | Desmarais, Jr. |
| 4,668,470 A | 5/1987 | Gilman et al. |
| 4,673,549 A | 6/1987 | Ecer |
| 4,674,572 A | 6/1987 | Gallus |
| 4,678,037 A | 7/1987 | Smith |
| 4,681,133 A | 7/1987 | Weston |
| 4,688,641 A | 8/1987 | Knieriemen |
| 4,690,796 A | 9/1987 | Paliwal |
| 4,693,863 A | 9/1987 | Del Corso et al. |
| 4,703,807 A | 11/1987 | Weston |
| 4,706,753 A | 11/1987 | Ohkochi et al. |
| 4,708,202 A | 11/1987 | Sukup et al. |
| 4,708,208 A | 11/1987 | Halbardier |
| 4,709,761 A | 12/1987 | Setterberg, Jr. |
| 4,714,116 A | 12/1987 | Brunner |
| 4,716,964 A | 1/1988 | Erbstoesser et al. |
| 4,719,971 A | 1/1988 | Owens |
| 4,721,159 A | 1/1988 | Ohkochi et al. |
| 4,738,599 A | 4/1988 | Shilling |
| 4,741,973 A | 5/1988 | Condit et al. |
| 4,768,588 A | 9/1988 | Kupsa |
| 4,775,598 A | 10/1988 | Jaeckel |
| 4,784,226 A | 11/1988 | Wyatt |
| 4,805,699 A | 2/1989 | Halbardier |
| 4,817,725 A | 4/1989 | Jenkins |
| 4,834,184 A | 5/1989 | Streich et al. |
| H635 H | 6/1989 | Johnson et al. |
| 4,850,432 A | 7/1989 | Porter et al. |
| 4,853,056 A | 8/1989 | Hoffman |
| 4,869,324 A | 9/1989 | Holder |
| 4,869,325 A | 9/1989 | Halbardier |
| 4,880,059 A | 11/1989 | Brandell et al. |
| 4,889,187 A | 12/1989 | Terrell et al. |
| 4,890,675 A | 1/1990 | Dew |
| 4,901,794 A | 2/1990 | Baugh et al. |
| 4,909,320 A | 3/1990 | Hebert et al. |
| 4,929,415 A | 5/1990 | Okazaki |
| 4,932,474 A | 6/1990 | Schroeder, Jr. et al. |
| 4,938,309 A | 7/1990 | Emdy |
| 4,944,351 A | 7/1990 | Eriksen et al. |
| 4,949,788 A | 8/1990 | Szarka et al. |
| 4,952,902 A | 8/1990 | Kawaguchi et al. |
| 4,975,412 A | 12/1990 | Okazaki et al. |
| 4,977,958 A | 12/1990 | Miller |
| 4,981,177 A | 1/1991 | Carmody et al. |
| 4,986,361 A | 1/1991 | Mueller et al. |
| 4,997,622 A | 3/1991 | Regazzoni et al. |
| 5,006,044 A | 4/1991 | Walker, Sr. et al. |
| 5,010,955 A | 4/1991 | Springer |
| 5,036,921 A | 8/1991 | Pittard et al. |
| 5,048,611 A | 9/1991 | Cochran |
| 5,049,165 A | 9/1991 | Tselesin |
| 5,061,323 A | 10/1991 | DeLuccia |
| 5,063,775 A | 11/1991 | Walker, Sr. et al. |
| 5,073,207 A * | 12/1991 | Faure .................... C22C 1/0408 148/667 |
| 5,074,361 A | 12/1991 | Brisco et al. |
| 5,076,869 A | 12/1991 | Bourell et al. |
| 5,084,088 A | 1/1992 | Okazaki |
| 5,087,304 A | 2/1992 | Chang et al. |
| 5,090,480 A | 2/1992 | Pittard et al. |
| 5,095,988 A | 3/1992 | Bode |
| 5,103,911 A | 4/1992 | Heijnen |
| 5,117,915 A | 6/1992 | Mueller et al. |
| 5,161,614 A | 11/1992 | Wu et al. |
| 5,171,734 A | 12/1992 | Sanjurjo et al. |
| 5,178,216 A | 1/1993 | Giroux et al. |
| 5,181,571 A | 1/1993 | Mueller et al. |
| 5,183,631 A | 2/1993 | Kugimiya et al. |
| 5,188,182 A | 2/1993 | Echols, III et al. |
| 5,188,183 A | 2/1993 | Hopmann et al. |
| 5,204,055 A | 4/1993 | Sachs et al. |
| 5,222,867 A | 6/1993 | Walker, Sr. et al. |
| 5,226,483 A | 7/1993 | Williamson, Jr. |
| 5,228,518 A | 7/1993 | Wilson et al. |
| 5,234,055 A | 8/1993 | Cornette |
| 5,252,365 A | 10/1993 | White |
| 5,253,714 A | 10/1993 | Davis et al. |
| 5,271,468 A | 12/1993 | Streich et al. |
| 5,282,509 A | 2/1994 | Schurr, III |
| 5,292,478 A | 3/1994 | Scorey |
| 5,293,940 A | 3/1994 | Hromas et al. |
| 5,304,260 A | 4/1994 | Aikawa et al. |
| 5,304,588 A | 4/1994 | Boysen et al. |
| 5,309,874 A | 5/1994 | Willermet et al. |
| 5,310,000 A | 5/1994 | Arterbury et al. |
| 5,316,598 A | 5/1994 | Chang et al. |
| 5,318,746 A | 6/1994 | Lashmore |
| 5,352,522 A | 10/1994 | Kugimiya et al. |
| 5,380,473 A | 1/1995 | Bogue et al. |
| 5,387,380 A | 2/1995 | Cima et al. |
| 5,392,860 A | 2/1995 | Ross |
| 5,394,236 A | 2/1995 | Murnick |
| 5,394,941 A | 3/1995 | Venditto et al. |
| 5,398,754 A | 3/1995 | Dinhoble |
| 5,407,011 A | 4/1995 | Layton |
| 5,409,555 A | 4/1995 | Fujita et al. |
| 5,411,082 A | 5/1995 | Kennedy |
| 5,417,285 A | 5/1995 | Van Buskirk et al. |
| 5,425,424 A | 6/1995 | Reinhardt et al. |
| 5,427,177 A | 6/1995 | Jordan, Jr. et al. |
| 5,435,392 A | 7/1995 | Kennedy |
| 5,439,051 A | 8/1995 | Kennedy et al. |
| 5,454,430 A | 10/1995 | Kennedy et al. |
| 5,456,317 A | 10/1995 | Hood, III et al. |
| 5,456,327 A | 10/1995 | Denton et al. |
| 5,464,062 A | 11/1995 | Blizzard, Jr. |

(56) References Cited

U.S. PATENT DOCUMENTS

| | | |
|---|---|---|
| 5,472,048 A | 12/1995 | Kennedy et al. |
| 5,474,131 A | 12/1995 | Jordan, Jr. et al. |
| 5,477,923 A | 12/1995 | Jordan, Jr. et al. |
| 5,479,986 A | 1/1996 | Gano et al. |
| 5,506,055 A | 4/1996 | Dorfman et al. |
| 5,507,439 A | 4/1996 | Story |
| 5,511,620 A | 4/1996 | Baugh et al. |
| 5,524,699 A | 6/1996 | Cook |
| 5,526,880 A | 6/1996 | Jordan, Jr. et al. |
| 5,526,881 A | 6/1996 | Martin et al. |
| 5,529,746 A | 6/1996 | Knoss et al. |
| 5,533,573 A | 7/1996 | Jordan, Jr. et al. |
| 5,536,485 A | 7/1996 | Kume et al. |
| 5,558,153 A | 9/1996 | Holcombe et al. |
| 5,601,924 A | 2/1997 | Beane |
| 5,607,017 A | 3/1997 | Owens et al. |
| 5,623,993 A | 4/1997 | Van Buskirk et al. |
| 5,623,994 A | 4/1997 | Robinson |
| 5,636,691 A | 6/1997 | Hendrickson et al. |
| 5,641,023 A | 6/1997 | Ross et al. |
| 5,647,444 A | 7/1997 | Williams |
| 5,665,289 A | 9/1997 | Chung et al. |
| 5,677,372 A | 10/1997 | Yamamoto et al. |
| 5,685,372 A | 11/1997 | Gano |
| 5,701,576 A | 12/1997 | Fujita et al. |
| 5,707,214 A | 1/1998 | Schmidt |
| 5,709,269 A | 1/1998 | Head |
| 5,720,344 A | 2/1998 | Newman |
| 5,728,195 A | 3/1998 | Eastman et al. |
| 5,765,639 A | 6/1998 | Muth |
| 5,772,735 A | 6/1998 | Sehgal et al. |
| 5,782,305 A | 7/1998 | Hicks |
| 5,797,454 A | 8/1998 | Hipp |
| 5,826,652 A | 10/1998 | Tapp |
| 5,826,661 A | 10/1998 | Parker et al. |
| 5,829,520 A | 11/1998 | Johnson |
| 5,836,396 A | 11/1998 | Norman |
| 5,857,521 A | 1/1999 | Ross et al. |
| 5,881,816 A | 3/1999 | Wright |
| 5,896,819 A | 4/1999 | Turila et al. |
| 5,902,424 A | 5/1999 | Fujita et al. |
| 5,934,372 A | 8/1999 | Muth |
| 5,941,309 A | 8/1999 | Appleton |
| 5,960,881 A | 10/1999 | Allamon et al. |
| 5,985,466 A | 11/1999 | Atarashi et al. |
| 5,988,287 A | 11/1999 | Jordan, Jr. et al. |
| 5,990,051 A | 11/1999 | Ischy et al. |
| 5,992,452 A | 11/1999 | Nelson, II |
| 5,992,520 A | 11/1999 | Schultz et al. |
| 6,007,314 A | 12/1999 | Nelson, II |
| 6,024,915 A | 2/2000 | Kume et al. |
| 6,032,735 A | 3/2000 | Echols |
| 6,036,777 A | 3/2000 | Sachs |
| 6,047,773 A | 4/2000 | Zeltmann et al. |
| 6,050,340 A | 4/2000 | Scott |
| 6,069,313 A | 5/2000 | Kay |
| 6,076,600 A | 6/2000 | Vick, Jr. et al. |
| 6,079,496 A | 6/2000 | Hirth |
| 6,085,837 A | 7/2000 | Massinon et al. |
| 6,095,247 A | 8/2000 | Streich et al. |
| 6,119,783 A | 9/2000 | Parker et al. |
| 6,142,237 A | 11/2000 | Christmas et al. |
| 6,161,622 A | 12/2000 | Robb |
| 6,167,970 B1 | 1/2001 | Stout et al. |
| 6,170,583 B1 | 1/2001 | Boyce |
| 6,173,779 B1 | 1/2001 | Smith |
| 6,176,323 B1 | 1/2001 | Weirich et al. |
| 6,189,616 B1 | 2/2001 | Gano et al. |
| 6,189,618 B1 | 2/2001 | Beeman et al. |
| 6,213,202 B1 | 4/2001 | Read, Jr. |
| 6,220,350 B1 | 4/2001 | Brothers et al. |
| 6,220,357 B1 | 4/2001 | Carmichael et al. |
| 6,228,904 B1 | 5/2001 | Yadav et al. |
| 6,237,688 B1 | 5/2001 | Burleson et al. |
| 6,238,280 B1 | 5/2001 | Ritt et al. |
| 6,241,021 B1 | 6/2001 | Bowling |
| 6,248,399 B1 | 6/2001 | Hehmann |
| 6,250,392 B1 | 6/2001 | Muth |
| 6,261,432 B1 | 7/2001 | Huber et al. |
| 6,273,187 B1 | 8/2001 | Voisin, Jr. et al. |
| 6,276,452 B1 | 8/2001 | Davis et al. |
| 6,276,457 B1 | 8/2001 | Moffatt et al. |
| 6,279,656 B1 | 8/2001 | Sinclair et al. |
| 6,287,445 B1 | 9/2001 | Lashmore et al. |
| 6,302,205 B1 | 10/2001 | Ryll |
| 6,315,041 B1 | 11/2001 | Carlisle et al. |
| 6,315,050 B2 | 11/2001 | Vaynshteyn et al. |
| 6,325,148 B1 | 12/2001 | Trahan et al. |
| 6,328,110 B1 | 12/2001 | Joubert |
| 6,341,653 B1 | 1/2002 | Firmaniuk et al. |
| 6,341,747 B1 | 1/2002 | Schmidt et al. |
| 6,349,766 B1 | 2/2002 | Bussear et al. |
| 6,354,372 B1 | 3/2002 | Carisella et al. |
| 6,354,379 B2 | 3/2002 | Miszewski et al. |
| 6,357,322 B1 | 3/2002 | Dolan et al. |
| 6,357,332 B1 | 3/2002 | Vecchio |
| 6,371,206 B1 | 4/2002 | Mills |
| 6,372,346 B1 | 4/2002 | Toth |
| 6,382,244 B2 | 5/2002 | Vann |
| 6,390,195 B1 | 5/2002 | Nguyen et al. |
| 6,390,200 B1 | 5/2002 | Allamon et al. |
| 6,394,180 B1 | 5/2002 | Berscheidt et al. |
| 6,394,185 B1 | 5/2002 | Constien |
| 6,397,950 B1 | 6/2002 | Streich et al. |
| 6,401,547 B1 | 6/2002 | Hatfield et al. |
| 6,403,210 B1* | 6/2002 | Stuivinga ............... B22F 3/08 419/27 |
| 6,408,946 B1 | 6/2002 | Marshall et al. |
| 6,419,023 B1 | 7/2002 | George et al. |
| 6,439,313 B1 | 8/2002 | Thomeer et al. |
| 6,446,717 B1 | 9/2002 | White et al. |
| 6,457,525 B1 | 10/2002 | Scott |
| 6,467,546 B2 | 10/2002 | Allamon et al. |
| 6,470,965 B1 | 10/2002 | Winzer |
| 6,491,097 B1 | 12/2002 | Oneal et al. |
| 6,491,116 B2 | 12/2002 | Berscheidt et al. |
| 6,513,598 B2 | 2/2003 | Moore et al. |
| 6,513,600 B2 | 2/2003 | Ross |
| 6,540,033 B1 | 4/2003 | Sullivan et al. |
| 6,543,543 B2 | 4/2003 | Muth |
| 6,561,275 B2 | 5/2003 | Glass et al. |
| 6,588,507 B2 | 7/2003 | Dusterhoft et al. |
| 6,591,915 B2 | 7/2003 | Burris et al. |
| 6,601,648 B2 | 8/2003 | Ebinger |
| 6,601,650 B2 | 8/2003 | Sundararajan |
| 6,609,569 B2 | 8/2003 | Howlett et al. |
| 6,612,826 B1 | 9/2003 | Bauer et al. |
| 6,613,383 B1 | 9/2003 | George et al. |
| 6,619,400 B2 | 9/2003 | Brunet |
| 6,634,428 B2 | 10/2003 | Krauss et al. |
| 6,662,886 B2 | 12/2003 | Russell |
| 6,675,889 B1 | 1/2004 | Mullins et al. |
| 6,699,305 B2 | 3/2004 | Myrick |
| 6,712,153 B2 | 3/2004 | Turley et al. |
| 6,712,797 B1 | 3/2004 | Southern, Jr. |
| 6,713,177 B2 | 3/2004 | George et al. |
| 6,715,541 B2 | 4/2004 | Pedersen et al. |
| 6,719,051 B2 | 4/2004 | Hailey, Jr. et al. |
| 6,755,249 B2 | 6/2004 | Robison et al. |
| 6,769,491 B2 | 8/2004 | Zimmerman et al. |
| 6,776,228 B2 | 8/2004 | Pedersen et al. |
| 6,779,599 B2 | 8/2004 | Mullins et al. |
| 6,799,638 B2 | 10/2004 | Butterfield, Jr. |
| 6,810,960 B2 | 11/2004 | Pia |
| 6,817,414 B2 | 11/2004 | Lee |
| 6,831,044 B2 | 12/2004 | Constien |
| 6,883,611 B2 | 4/2005 | Smith et al. |
| 6,887,297 B2 | 5/2005 | Winter et al. |
| 6,896,049 B2 | 5/2005 | Moyes |
| 6,896,061 B2 | 5/2005 | Hriscu et al. |
| 6,899,176 B2 | 5/2005 | Hailey, Jr. et al. |
| 6,899,777 B2 | 5/2005 | Vaidyanathan et al. |
| 6,908,516 B2 | 6/2005 | Hehmann et al. |
| 6,913,827 B2 | 7/2005 | George et al. |

(56) References Cited

U.S. PATENT DOCUMENTS

| | | |
|---|---|---|
| 6,926,086 B2 | 8/2005 | Patterson et al. |
| 6,932,159 B2 | 8/2005 | Hovem |
| 6,939,388 B2 | 9/2005 | Angeliu |
| 6,945,331 B2 | 9/2005 | Patel |
| 6,951,331 B2 | 10/2005 | Haughom et al. |
| 6,959,759 B2 | 11/2005 | Doane et al. |
| 6,973,970 B2 | 12/2005 | Johnston et al. |
| 6,973,973 B2 | 12/2005 | Howard et al. |
| 6,983,796 B2 | 1/2006 | Bayne et al. |
| 6,986,390 B2 | 1/2006 | Doane et al. |
| 7,013,989 B2 | 3/2006 | Hammond et al. |
| 7,013,998 B2 | 3/2006 | Ray et al. |
| 7,017,664 B2 | 3/2006 | Walker et al. |
| 7,017,677 B2 | 3/2006 | Keshavan et al. |
| 7,021,389 B2 | 4/2006 | Bishop et al. |
| 7,025,146 B2 | 4/2006 | King et al. |
| 7,028,778 B2 | 4/2006 | Krywitsky |
| 7,044,230 B2 | 5/2006 | Starr et al. |
| 7,049,272 B2 | 5/2006 | Sinclair et al. |
| 7,051,805 B2 | 5/2006 | Doane et al. |
| 7,059,410 B2 | 6/2006 | Bousche et al. |
| 7,090,027 B1 | 8/2006 | Williams |
| 7,093,664 B2 | 8/2006 | Todd et al. |
| 7,096,945 B2 | 8/2006 | Richards et al. |
| 7,096,946 B2 | 8/2006 | Jasser et al. |
| 7,097,807 B1 | 8/2006 | Meeks, III et al. |
| 7,097,906 B2 | 8/2006 | Gardner |
| 7,108,080 B2 | 9/2006 | Tessari et al. |
| 7,111,682 B2 | 9/2006 | Blaisdell |
| 7,128,145 B2 | 10/2006 | Mickey |
| 7,141,207 B2 | 11/2006 | Jandeska, Jr. et al. |
| 7,150,326 B2 | 12/2006 | Bishop et al. |
| 7,163,066 B2 | 1/2007 | Lehr |
| 7,165,622 B2 | 1/2007 | Hirth et al. |
| 7,168,494 B2 | 1/2007 | Starr et al. |
| 7,174,963 B2 | 2/2007 | Bertelsen |
| 7,182,135 B2 | 2/2007 | Szarka |
| 7,188,559 B1 | 3/2007 | Vecchio |
| 7,210,527 B2 | 5/2007 | Walker et al. |
| 7,210,533 B2 | 5/2007 | Starr et al. |
| 7,217,311 B2 | 5/2007 | Hong et al. |
| 7,234,530 B2 | 6/2007 | Gass |
| 7,250,188 B2 | 7/2007 | Dodelet et al. |
| 7,252,162 B2 | 8/2007 | Akinlade et al. |
| 7,255,172 B2 | 8/2007 | Johnson |
| 7,255,178 B2 | 8/2007 | Slup et al. |
| 7,264,060 B2 | 9/2007 | Wills |
| 7,267,172 B2 | 9/2007 | Hofman |
| 7,267,178 B2 | 9/2007 | Krywitsky |
| 7,270,186 B2 | 9/2007 | Johnson |
| 7,287,592 B2 | 10/2007 | Surjaatmadja et al. |
| 7,311,152 B2 | 12/2007 | Howard et al. |
| 7,316,274 B2 | 1/2008 | Xu et al. |
| 7,320,365 B2 | 1/2008 | Pia |
| 7,322,412 B2 | 1/2008 | Badalamenti et al. |
| 7,322,417 B2 | 1/2008 | Rytlewski et al. |
| 7,325,617 B2 | 2/2008 | Murray |
| 7,328,750 B2 | 2/2008 | Swor et al. |
| 7,331,388 B2 | 2/2008 | Vilela et al. |
| 7,337,854 B2 | 3/2008 | Horn et al. |
| 7,346,456 B2 | 3/2008 | Le Bemadjiel |
| 7,350,582 B2 | 4/2008 | McKeachnie et al. |
| 7,353,879 B2 | 4/2008 | Todd et al. |
| 7,360,593 B2 | 4/2008 | Constien |
| 7,360,597 B2 | 4/2008 | Blaisdell |
| 7,363,970 B2 | 4/2008 | Corre et al. |
| 7,373,978 B2 | 5/2008 | Barry et al. |
| 7,384,443 B2 | 6/2008 | Mirchandani |
| 7,387,158 B2 | 6/2008 | Murray et al. |
| 7,387,165 B2 | 6/2008 | Lopez De Cardenas et al. |
| 7,392,841 B2 | 7/2008 | Murray et al. |
| 7,401,648 B2 | 7/2008 | Bennett |
| 7,416,029 B2 | 8/2008 | Telfer et al. |
| 7,422,058 B2 | 9/2008 | O'Malley |
| 7,426,964 B2 | 9/2008 | Lynde et al. |
| 7,441,596 B2 | 10/2008 | Wood et al. |
| 7,445,049 B2 | 11/2008 | Howard et al. |
| 7,451,815 B2 | 11/2008 | Hailey, Jr. |
| 7,451,817 B2 | 11/2008 | Reddy et al. |
| 7,461,699 B2 | 12/2008 | Richard et al. |
| 7,464,764 B2 | 12/2008 | Xu |
| 7,472,750 B2 | 1/2009 | Walker et al. |
| 7,478,676 B2 | 1/2009 | East, Jr. et al. |
| 7,503,390 B2 | 3/2009 | Gomez |
| 7,503,399 B2 | 3/2009 | Badalamenti et al. |
| 7,509,993 B1 | 3/2009 | Turng et al. |
| 7,510,018 B2 | 3/2009 | Williamson et al. |
| 7,513,311 B2 | 4/2009 | Gramstad et al. |
| 7,527,103 B2 | 5/2009 | Huang et al. |
| 7,537,825 B1 | 5/2009 | Wardle et al. |
| 7,552,777 B2 | 6/2009 | Murray et al. |
| 7,552,779 B2 | 6/2009 | Murray |
| 7,559,357 B2 | 7/2009 | Clem |
| 7,575,062 B2 | 8/2009 | East, Jr. |
| 7,579,087 B2 | 8/2009 | Maloney et al. |
| 7,591,318 B2 | 9/2009 | Tilghman |
| 7,600,572 B2 | 10/2009 | Slup et al. |
| 7,604,049 B2 | 10/2009 | Vaidya et al. |
| 7,604,055 B2 | 10/2009 | Richard et al. |
| 7,607,476 B2 | 10/2009 | Tom et al. |
| 7,617,871 B2 | 11/2009 | Surjaatmadja et al. |
| 7,635,023 B2 | 12/2009 | Goldberg et al. |
| 7,640,988 B2 | 1/2010 | Phi et al. |
| 7,661,480 B2 | 2/2010 | Al-Anazi |
| 7,661,481 B2 | 2/2010 | Todd et al. |
| 7,665,537 B2 | 2/2010 | Patel et al. |
| 7,686,082 B2 | 3/2010 | Marsh |
| 7,690,436 B2 | 4/2010 | Turley et al. |
| 7,699,101 B2 | 4/2010 | Fripp et al. |
| 7,703,510 B2 | 4/2010 | Xu |
| 7,703,511 B2 | 4/2010 | Buyers et al. |
| 7,708,078 B2 | 5/2010 | Stoesz |
| 7,709,421 B2 | 5/2010 | Jones et al. |
| 7,712,541 B2 | 5/2010 | Loretz et al. |
| 7,723,272 B2 | 5/2010 | Crews et al. |
| 7,726,406 B2 | 6/2010 | Xu |
| 7,735,578 B2 | 6/2010 | Loehr et al. |
| 7,743,836 B2 | 6/2010 | Cook et al. |
| 7,752,971 B2 | 7/2010 | Loehr |
| 7,757,773 B2 | 7/2010 | Rytlewski |
| 7,762,342 B2 | 7/2010 | Richard et al. |
| 7,770,652 B2 | 8/2010 | Barnett |
| 7,771,289 B2 | 8/2010 | Palumbo et al. |
| 7,775,284 B2 | 8/2010 | Richards et al. |
| 7,775,285 B2 | 8/2010 | Surjaatmadja et al. |
| 7,775,286 B2 | 8/2010 | Duphorne |
| 7,784,543 B2 | 8/2010 | Johnson |
| 7,793,714 B2 | 9/2010 | Johnson |
| 7,793,820 B2 | 9/2010 | Hirano et al. |
| 7,798,225 B2 | 9/2010 | Giroux et al. |
| 7,798,226 B2 | 9/2010 | Themig |
| 7,798,236 B2 | 9/2010 | McKeachnie et al. |
| 7,806,189 B2 | 10/2010 | Frazier |
| 7,806,192 B2 | 10/2010 | Foster et al. |
| 7,810,553 B2 | 10/2010 | Cruickshank et al. |
| 7,810,567 B2 | 10/2010 | Daniels et al. |
| 7,819,198 B2 | 10/2010 | Birckhead et al. |
| 7,828,055 B2 | 11/2010 | Willauer et al. |
| 7,833,944 B2 | 11/2010 | Munoz et al. |
| 7,849,927 B2 | 12/2010 | Herrera |
| 7,851,016 B2 | 12/2010 | Arbab et al. |
| 7,855,168 B2 | 12/2010 | Fuller et al. |
| 7,861,779 B2 | 1/2011 | Vestavik |
| 7,861,781 B2 | 1/2011 | D'Arcy |
| 7,874,365 B2 | 1/2011 | East, Jr. et al. |
| 7,878,253 B2 | 2/2011 | Stowe et al. |
| 7,896,091 B2 | 3/2011 | Williamson et al. |
| 7,897,063 B1 | 3/2011 | Perry et al. |
| 7,900,696 B1 | 3/2011 | Nish et al. |
| 7,900,703 B2 | 3/2011 | Clark et al. |
| 7,909,096 B2 | 3/2011 | Clark et al. |
| 7,909,104 B2 | 3/2011 | Bjorgum |
| 7,909,110 B2 | 3/2011 | Sharma et al. |
| 7,909,115 B2 | 3/2011 | Grove et al. |

(56) References Cited

U.S. PATENT DOCUMENTS

| | | |
|---|---|---|
| 7,913,765 B2 | 3/2011 | Crow et al. |
| 7,918,275 B2 | 4/2011 | Clem |
| 7,931,093 B2 | 4/2011 | Foster et al. |
| 7,938,191 B2 | 5/2011 | Vaidya |
| 7,946,335 B2 | 5/2011 | Bewlay et al. |
| 7,946,340 B2 | 5/2011 | Surjaatmadja et al. |
| 7,958,940 B2 | 6/2011 | Jameson |
| 7,963,331 B2 | 6/2011 | Surjaatmadja et al. |
| 7,963,340 B2 | 6/2011 | Gramstad et al. |
| 7,963,342 B2 | 6/2011 | George |
| 7,980,300 B2 | 7/2011 | Roberts et al. |
| 7,987,906 B1 | 8/2011 | Troy |
| 7,992,763 B2 | 8/2011 | Vecchio et al. |
| 8,020,619 B1 | 9/2011 | Robertson et al. |
| 8,020,620 B2 | 9/2011 | Daniels et al. |
| 8,025,104 B2 | 9/2011 | Cooke, Jr. |
| 8,028,767 B2 | 10/2011 | Radford et al. |
| 8,033,331 B2 | 10/2011 | Themig |
| 8,039,422 B1 | 10/2011 | Al-Zahrani |
| 8,056,628 B2 | 11/2011 | Whitsitt et al. |
| 8,056,638 B2 | 11/2011 | Clayton et al. |
| 8,109,340 B2 | 2/2012 | Doane et al. |
| 8,127,856 B1 | 3/2012 | Nish et al. |
| 8,153,052 B2 | 4/2012 | Jackson et al. |
| 8,163,060 B2 | 4/2012 | Imanishi et al. |
| 8,211,247 B2 | 7/2012 | Marya et al. |
| 8,211,248 B2 | 7/2012 | Marya |
| 8,226,740 B2 | 7/2012 | Chaumonnot et al. |
| 8,230,731 B2 | 7/2012 | Dyer et al. |
| 8,231,947 B2 | 7/2012 | Vaidya et al. |
| 8,263,178 B2 | 9/2012 | Boulos et al. |
| 8,276,670 B2 | 10/2012 | Patel |
| 8,277,974 B2 | 10/2012 | Kumar et al. |
| 8,297,364 B2 | 10/2012 | Agrawal et al. |
| 8,327,931 B2 | 12/2012 | Agrawal et al. |
| 8,403,037 B2 | 3/2013 | Agrawal et al. |
| 8,413,727 B2 | 4/2013 | Holmes |
| 8,425,651 B2 | 4/2013 | Xu et al. |
| 8,459,347 B2 | 6/2013 | Stout |
| 8,490,689 B1 | 7/2013 | McClinton et al. |
| 8,535,604 B1 | 9/2013 | Baker et al. |
| 8,573,295 B2 | 11/2013 | Johnson et al. |
| 8,631,876 B2 | 1/2014 | Xu et al. |
| 8,956,660 B2 | 2/2015 | Launag et al. |
| 9,079,246 B2 | 7/2015 | Xu et al. |
| 9,080,098 B2 | 7/2015 | Xu et al. |
| 9,090,955 B2 | 7/2015 | Xu et al. |
| 9,243,475 B2 | 1/2016 | Xu |
| 9,260,935 B2 | 2/2016 | Murphree et al. |
| 9,643,250 B2 * | 5/2017 | Mazyar ............... C09K 8/54 |
| 9,833,838 B2 * | 12/2017 | Mazyar ............... B22F 1/025 |
| 2001/0040180 A1 | 11/2001 | Wittebrood et al. |
| 2001/0045285 A1 | 11/2001 | Russell |
| 2001/0045288 A1 | 11/2001 | Allamon et al. |
| 2002/0000319 A1 | 1/2002 | Brunet |
| 2002/0007948 A1 | 1/2002 | Bayne et al. |
| 2002/0014268 A1 | 2/2002 | Vann |
| 2002/0020527 A1 | 2/2002 | Kilaas et al. |
| 2002/0066572 A1 | 6/2002 | Muth |
| 2002/0092654 A1 | 7/2002 | Coronado et al. |
| 2002/0096365 A1 | 7/2002 | Berscheidt et al. |
| 2002/0104616 A1 | 8/2002 | De et al. |
| 2002/0108756 A1 | 8/2002 | Harrall et al. |
| 2002/0136904 A1 | 9/2002 | Glass et al. |
| 2002/0139541 A1 | 10/2002 | Sheffield et al. |
| 2002/0162661 A1 | 11/2002 | Krauss et al. |
| 2003/0019639 A1 | 1/2003 | MacKay |
| 2003/0037925 A1 | 2/2003 | Walker et al. |
| 2003/0060374 A1 | 3/2003 | Cooke, Jr. |
| 2003/0075326 A1 | 4/2003 | Ebinger |
| 2003/0104147 A1 | 6/2003 | Bretschneider et al. |
| 2003/0111728 A1 | 6/2003 | Thai et al. |
| 2003/0127013 A1 | 7/2003 | Zavitsanos et al. |
| 2003/0141060 A1 | 7/2003 | Hailey et al. |
| 2003/0141061 A1 | 7/2003 | Hailey et al. |
| 2003/0141079 A1 | 7/2003 | Doane et al. |
| 2003/0150614 A1 | 8/2003 | Brown et al. |
| 2003/0155114 A1 | 8/2003 | Pedersen et al. |
| 2003/0155115 A1 | 8/2003 | Pedersen et al. |
| 2003/0159828 A1 | 8/2003 | Howard et al. |
| 2003/0164237 A1 | 9/2003 | Butterfield |
| 2003/0183391 A1 | 10/2003 | Hriscu et al. |
| 2003/0226668 A1 | 12/2003 | Zimmerman et al. |
| 2004/0005483 A1 | 1/2004 | Lin |
| 2004/0020832 A1 | 2/2004 | Richards et al. |
| 2004/0031605 A1 | 2/2004 | Mickey |
| 2004/0045723 A1 | 3/2004 | Slup et al. |
| 2004/0055758 A1 | 3/2004 | Brezinski et al. |
| 2004/0058167 A1 | 3/2004 | Arbab et al. |
| 2004/0069502 A1 | 4/2004 | Luke |
| 2004/0089449 A1 | 5/2004 | Walton et al. |
| 2004/0094297 A1 | 5/2004 | Malone et al. |
| 2004/0154806 A1 | 8/2004 | Bode et al. |
| 2004/0159428 A1 | 8/2004 | Hammond et al. |
| 2004/0159446 A1 | 8/2004 | Haugen et al. |
| 2004/0182583 A1 | 9/2004 | Doane et al. |
| 2004/0216868 A1 | 11/2004 | Owen, Sr. |
| 2004/0231845 A1 | 11/2004 | Cooke, Jr. |
| 2004/0251025 A1 | 12/2004 | Giroux et al. |
| 2004/0256109 A1 | 12/2004 | Johnson |
| 2004/0256157 A1 | 12/2004 | Tessari et al. |
| 2004/0261993 A1 | 12/2004 | Nguyen |
| 2004/0261994 A1 | 12/2004 | Nguyen et al. |
| 2005/0034876 A1 | 2/2005 | Doane et al. |
| 2005/0051329 A1 | 3/2005 | Blaisdell |
| 2005/0064247 A1 | 3/2005 | Sane |
| 2005/0069449 A1 | 3/2005 | Jackson et al. |
| 2005/0074612 A1 * | 4/2005 | Eklund ............... B22F 1/0018 428/403 |
| 2005/0098313 A1 | 5/2005 | Atkins et al. |
| 2005/0102255 A1 | 5/2005 | Bultman |
| 2005/0106316 A1 | 5/2005 | Rigney et al. |
| 2005/0126334 A1 | 6/2005 | Mirchandani |
| 2005/0161212 A1 | 7/2005 | Leismer et al. |
| 2005/0161224 A1 | 7/2005 | Starr et al. |
| 2005/0165149 A1 | 7/2005 | Chanak et al. |
| 2005/0194143 A1 | 9/2005 | Xu et al. |
| 2005/0199401 A1 | 9/2005 | Patel et al. |
| 2005/0205264 A1 | 9/2005 | Starr et al. |
| 2005/0205265 A1 | 9/2005 | Todd et al. |
| 2005/0205266 A1 | 9/2005 | Todd et al. |
| 2005/0235757 A1 | 10/2005 | De Jonge et al. |
| 2005/0241824 A1 | 11/2005 | Burris, II et al. |
| 2005/0241825 A1 | 11/2005 | Burris, II et al. |
| 2005/0257936 A1 | 11/2005 | Lehr |
| 2005/0268746 A1 | 12/2005 | Abkowitz et al. |
| 2005/0269097 A1 | 12/2005 | Towler |
| 2005/0275143 A1 | 12/2005 | Toth |
| 2005/0279501 A1 | 12/2005 | Surjaatmadja et al. |
| 2006/0012087 A1 | 1/2006 | Matsuda et al. |
| 2006/0013350 A1 | 1/2006 | Akers |
| 2006/0045787 A1 * | 3/2006 | Jandeska, Jr. ............ B22F 1/025 419/47 |
| 2006/0057479 A1 | 3/2006 | Niimi et al. |
| 2006/0081378 A1 | 4/2006 | Howard et al. |
| 2006/0102871 A1 | 5/2006 | Wang |
| 2006/0108114 A1 | 5/2006 | Johnson et al. |
| 2006/0108126 A1 | 5/2006 | Horn et al. |
| 2006/0110615 A1 | 5/2006 | Karim et al. |
| 2006/0116696 A1 | 6/2006 | Odermatt et al. |
| 2006/0124310 A1 | 6/2006 | Lopez de Cardenas et al. |
| 2006/0131011 A1 | 6/2006 | Lynde et al. |
| 2006/0131031 A1 | 6/2006 | McKeachnie et al. |
| 2006/0131081 A1 | 6/2006 | Mirchandani et al. |
| 2006/0134312 A1 | 6/2006 | Rytlewski et al. |
| 2006/0144515 A1 | 7/2006 | Tada et al. |
| 2006/0150770 A1 * | 7/2006 | Freim, III ............... B22F 1/025 75/343 |
| 2006/0151178 A1 | 7/2006 | Howard et al. |
| 2006/0153728 A1 | 7/2006 | Schoenung et al. |
| 2006/0162927 A1 | 7/2006 | Walker et al. |
| 2006/0169453 A1 | 8/2006 | Savery et al. |
| 2006/0186602 A1 | 8/2006 | Martin et al. |
| 2006/0207763 A1 | 9/2006 | Hofman et al. |

(56) References Cited

U.S. PATENT DOCUMENTS

| | | |
|---|---|---|
| 2006/0213670 A1 | 9/2006 | Bishop et al. |
| 2006/0231253 A1 | 10/2006 | Vilela et al. |
| 2006/0283592 A1 | 12/2006 | Sierra et al. |
| 2007/0017674 A1 | 1/2007 | Blaisdell |
| 2007/0017675 A1 | 1/2007 | Hammami |
| 2007/0029082 A1 | 2/2007 | Giroux et al. |
| 2007/0039161 A1 | 2/2007 | Garcia |
| 2007/0039741 A1 | 2/2007 | Hailey |
| 2007/0044958 A1 | 3/2007 | Rytlewski et al. |
| 2007/0044966 A1 | 3/2007 | Davies et al. |
| 2007/0051521 A1 | 3/2007 | Fike et al. |
| 2007/0053785 A1 | 3/2007 | Hetz et al. |
| 2007/0054101 A1 | 3/2007 | Sigalas et al. |
| 2007/0057415 A1 | 3/2007 | Katagiri et al. |
| 2007/0062644 A1 | 3/2007 | Nakamura et al. |
| 2007/0074601 A1 | 4/2007 | Hong et al. |
| 2007/0074873 A1 | 4/2007 | McKeachnie et al. |
| 2007/0102199 A1 | 5/2007 | Smith et al. |
| 2007/0107899 A1 | 5/2007 | Werner et al. |
| 2007/0107908 A1 | 5/2007 | Vaidya et al. |
| 2007/0108060 A1 | 5/2007 | Park |
| 2007/0119600 A1 | 5/2007 | Slup et al. |
| 2007/0131912 A1 | 6/2007 | Simone et al. |
| 2007/0151009 A1 | 7/2007 | Conrad, III et al. |
| 2007/0151769 A1 | 7/2007 | Slutz et al. |
| 2007/0169935 A1 | 7/2007 | Akbar et al. |
| 2007/0181224 A1* | 8/2007 | Marya .................. C09K 8/805 148/400 |
| 2007/0185655 A1 | 8/2007 | Le Bemadjiel |
| 2007/0187095 A1 | 8/2007 | Walker et al. |
| 2007/0207182 A1 | 9/2007 | Weber et al. |
| 2007/0221373 A1 | 9/2007 | Murray |
| 2007/0221384 A1 | 9/2007 | Murray |
| 2007/0227745 A1 | 10/2007 | Roberts et al. |
| 2007/0259994 A1 | 11/2007 | Tour et al. |
| 2007/0261862 A1 | 11/2007 | Murray |
| 2007/0272411 A1 | 11/2007 | Lopez De Cardenas et al. |
| 2007/0272413 A1 | 11/2007 | Rytlewski et al. |
| 2007/0277979 A1 | 12/2007 | Todd et al. |
| 2007/0284109 A1 | 12/2007 | East et al. |
| 2007/0284112 A1 | 12/2007 | Magne et al. |
| 2007/0299510 A1 | 12/2007 | Venkatraman et al. |
| 2008/0011473 A1 | 1/2008 | Wood et al. |
| 2008/0020923 A1 | 1/2008 | Debe et al. |
| 2008/0047707 A1 | 2/2008 | Boney et al. |
| 2008/0060810 A9 | 3/2008 | Nguyen et al. |
| 2008/0066923 A1 | 3/2008 | Xu |
| 2008/0066924 A1 | 3/2008 | Xu |
| 2008/0072705 A1 | 3/2008 | Chaumonnot et al. |
| 2008/0078553 A1 | 4/2008 | George |
| 2008/0081866 A1 | 4/2008 | Gong et al. |
| 2008/0093073 A1 | 4/2008 | Bustos et al. |
| 2008/0099209 A1 | 5/2008 | Loretz et al. |
| 2008/0105438 A1 | 5/2008 | Jordan et al. |
| 2008/0115932 A1 | 5/2008 | Cooke |
| 2008/0121390 A1 | 5/2008 | O'Malley et al. |
| 2008/0121436 A1 | 5/2008 | Slay et al. |
| 2008/0127475 A1 | 6/2008 | Griffo |
| 2008/0135249 A1 | 6/2008 | Fripp et al. |
| 2008/0149325 A1 | 6/2008 | Crawford |
| 2008/0149345 A1 | 6/2008 | Bicerano |
| 2008/0149351 A1 | 6/2008 | Marya et al. |
| 2008/0169105 A1 | 7/2008 | Williamson et al. |
| 2008/0169130 A1 | 7/2008 | Norman et al. |
| 2008/0179060 A1 | 7/2008 | Surjaatmadja et al. |
| 2008/0179104 A1 | 7/2008 | Zhang et al. |
| 2008/0196801 A1 | 8/2008 | Zhao et al. |
| 2008/0202764 A1 | 8/2008 | Clayton et al. |
| 2008/0202814 A1 | 8/2008 | Lyons et al. |
| 2008/0210473 A1 | 9/2008 | Zhang et al. |
| 2008/0216383 A1 | 9/2008 | Pierick et al. |
| 2008/0223586 A1 | 9/2008 | Barnett |
| 2008/0223587 A1 | 9/2008 | Cherewyk |
| 2008/0236829 A1 | 10/2008 | Lynde |
| 2008/0236842 A1 | 10/2008 | Bhavsar et al. |
| 2008/0248205 A1 | 10/2008 | Blanchet et al. |
| 2008/0248413 A1 | 10/2008 | Ishii et al. |
| 2008/0264594 A1 | 10/2008 | Lohmueller et al. |
| 2008/0277109 A1 | 11/2008 | Vaidya |
| 2008/0277980 A1 | 11/2008 | Koda et al. |
| 2008/0282924 A1 | 11/2008 | Saenger et al. |
| 2008/0296024 A1 | 12/2008 | Tianping et al. |
| 2008/0302538 A1 | 12/2008 | Hofman |
| 2008/0314581 A1 | 12/2008 | Brown |
| 2008/0314588 A1 | 12/2008 | Langlais et al. |
| 2009/0038858 A1 | 2/2009 | Griffo et al. |
| 2009/0044946 A1 | 2/2009 | Schasteen et al. |
| 2009/0044949 A1 | 2/2009 | King et al. |
| 2009/0050334 A1 | 2/2009 | Marya et al. |
| 2009/0056934 A1 | 3/2009 | Xu |
| 2009/0065216 A1 | 3/2009 | Frazier |
| 2009/0074603 A1 | 3/2009 | Chan et al. |
| 2009/0084553 A1 | 4/2009 | Rytlewski et al. |
| 2009/0084556 A1 | 4/2009 | Richards et al. |
| 2009/0084600 A1 | 4/2009 | Severance |
| 2009/0090440 A1 | 4/2009 | Kellett et al. |
| 2009/0107684 A1 | 4/2009 | Cooke, Jr. |
| 2009/0114381 A1 | 5/2009 | Stroobants |
| 2009/0114382 A1 | 5/2009 | Grove et al. |
| 2009/0126436 A1 | 5/2009 | Fly et al. |
| 2009/0139720 A1 | 6/2009 | Frazier |
| 2009/0145666 A1 | 6/2009 | Radford et al. |
| 2009/0151949 A1 | 6/2009 | Marya et al. |
| 2009/0152009 A1 | 6/2009 | Slay et al. |
| 2009/0155616 A1 | 6/2009 | Thamida et al. |
| 2009/0159289 A1 | 6/2009 | Avant et al. |
| 2009/0178808 A1 | 7/2009 | Williamson et al. |
| 2009/0194273 A1 | 8/2009 | Surjaatmadja et al. |
| 2009/0205841 A1 | 8/2009 | Kluge et al. |
| 2009/0211770 A1 | 8/2009 | Nutley et al. |
| 2009/0226340 A1 | 9/2009 | Marya |
| 2009/0226704 A1 | 9/2009 | Kauppinen et al. |
| 2009/0242202 A1 | 10/2009 | Rispler et al. |
| 2009/0242208 A1 | 10/2009 | Bolding |
| 2009/0242214 A1 | 10/2009 | Foster et al. |
| 2009/0255667 A1 | 10/2009 | Clem et al. |
| 2009/0255684 A1 | 10/2009 | Bolding |
| 2009/0255686 A1 | 10/2009 | Richard |
| 2009/0266548 A1 | 10/2009 | Olsen et al. |
| 2009/0260817 A1 | 11/2009 | Gambier et al. |
| 2009/0272544 A1 | 11/2009 | Giroux et al. |
| 2009/0283270 A1 | 11/2009 | Langeslag |
| 2009/0293672 A1 | 12/2009 | Mirchandani et al. |
| 2009/0301730 A1 | 12/2009 | Gweily |
| 2009/0305131 A1 | 12/2009 | Kumar et al. |
| 2009/0308588 A1 | 12/2009 | Howell et al. |
| 2009/0317556 A1 | 12/2009 | Macary |
| 2009/0317622 A1 | 12/2009 | Huang et al. |
| 2010/0003536 A1 | 1/2010 | Smith et al. |
| 2010/0012385 A1 | 1/2010 | Drivdahl et al. |
| 2010/0015002 A1 | 1/2010 | Barrera et al. |
| 2010/0015469 A1 | 1/2010 | Romanowski et al. |
| 2010/0025255 A1 | 2/2010 | Su et al. |
| 2010/0032151 A1 | 2/2010 | Duphorne et al. |
| 2010/0034857 A1 | 2/2010 | Launag et al. |
| 2010/0038076 A1 | 2/2010 | Spray et al. |
| 2010/0038595 A1 | 2/2010 | Imholt et al. |
| 2010/0040180 A1 | 2/2010 | Kim et al. |
| 2010/0044041 A1 | 2/2010 | Smith et al. |
| 2010/0051278 A1 | 3/2010 | Mytopher et al. |
| 2010/0055491 A1 | 3/2010 | Vecchio et al. |
| 2010/0055492 A1 | 3/2010 | Barsoum et al. |
| 2010/0089583 A1 | 4/2010 | Xu et al. |
| 2010/0089587 A1 | 4/2010 | Stout |
| 2010/0101803 A1 | 4/2010 | Clayton et al. |
| 2010/0116495 A1 | 5/2010 | Spray |
| 2010/0122817 A1 | 5/2010 | Surjaatmadja et al. |
| 2010/0139930 A1 | 6/2010 | Patel et al. |
| 2010/0200230 A1 | 8/2010 | East, Jr. et al. |
| 2010/0236793 A1 | 9/2010 | Bjorgum |
| 2010/0236794 A1 | 9/2010 | Duan et al. |
| 2010/0243254 A1 | 9/2010 | Murphy et al. |
| 2010/0252273 A1 | 10/2010 | Duphorne |
| 2010/0252280 A1 | 10/2010 | Swor et al. |

(56) References Cited

U.S. PATENT DOCUMENTS

| | | |
|---|---|---|
| 2010/0270031 A1 | 10/2010 | Patel |
| 2010/0276136 A1 | 11/2010 | Evans et al. |
| 2010/0276159 A1 | 11/2010 | Mailand et al. |
| 2010/0282338 A1 | 11/2010 | Gerrard et al. |
| 2010/0282469 A1 | 11/2010 | Richard et al. |
| 2010/0294510 A1 | 11/2010 | Holmes |
| 2010/0297432 A1 | 11/2010 | Sherman et al. |
| 2010/0304182 A1 | 12/2010 | Facchini et al. |
| 2010/0314105 A1 | 12/2010 | Rose |
| 2010/0314126 A1 | 12/2010 | Kellner |
| 2010/0319870 A1 | 12/2010 | Bewlay et al. |
| 2010/0326650 A1 | 12/2010 | Tran et al. |
| 2011/0005773 A1 | 1/2011 | Dusterhoft et al. |
| 2011/0036592 A1 | 2/2011 | Fay |
| 2011/0048743 A1 | 3/2011 | Stafford et al. |
| 2011/0052805 A1 | 3/2011 | Bordere et al. |
| 2011/0056692 A1 | 3/2011 | Lopez De Cardenas et al. |
| 2011/0056702 A1 | 3/2011 | Sharma et al. |
| 2011/0067872 A1 | 3/2011 | Agrawal |
| 2011/0067889 A1 | 3/2011 | Marya et al. |
| 2011/0067890 A1 | 3/2011 | Themig |
| 2011/0094406 A1 | 4/2011 | Marya et al. |
| 2011/0100643 A1 | 5/2011 | Themig et al. |
| 2011/0127044 A1 | 6/2011 | Radford et al. |
| 2011/0132143 A1* | 6/2011 | Xu .................. B22F 1/02 75/232 |
| 2011/0132612 A1* | 6/2011 | Agrawal .......... E21B 43/112 166/317 |
| 2011/0132619 A1* | 6/2011 | Agrawal .......... E21B 23/04 166/376 |
| 2011/0132620 A1* | 6/2011 | Agrawal .......... E21B 23/04 166/376 |
| 2011/0132621 A1* | 6/2011 | Agrawal .......... E21B 23/04 166/376 |
| 2011/0135530 A1* | 6/2011 | Xu .................. B22F 1/02 419/13 |
| 2011/0135805 A1 | 6/2011 | Doucet et al. |
| 2011/0135953 A1* | 6/2011 | Xu .................. B22F 1/02 428/548 |
| 2011/0136707 A1* | 6/2011 | Xu .................. C22C 1/04 507/270 |
| 2011/0139465 A1 | 6/2011 | Tibbles et al. |
| 2011/0147014 A1 | 6/2011 | Chen et al. |
| 2011/0186306 A1 | 8/2011 | Marya et al. |
| 2011/0214881 A1 | 9/2011 | Newton |
| 2011/0247833 A1 | 10/2011 | Todd et al. |
| 2011/0253387 A1 | 10/2011 | Ervin |
| 2011/0256356 A1 | 10/2011 | Tomantschger et al. |
| 2011/0259610 A1 | 10/2011 | Shkurti et al. |
| 2011/0277987 A1 | 11/2011 | Frazier |
| 2011/0277989 A1 | 11/2011 | Frazier |
| 2011/0284232 A1 | 11/2011 | Huang |
| 2011/0284240 A1 | 11/2011 | Chen et al. |
| 2011/0284243 A1 | 11/2011 | Frazier |
| 2011/0300403 A1 | 12/2011 | Vecchio et al. |
| 2011/0314881 A1 | 12/2011 | Hatcher et al. |
| 2012/0067426 A1 | 3/2012 | Soni et al. |
| 2012/0090839 A1 | 4/2012 | Rudic |
| 2012/0103135 A1 | 5/2012 | Xu et al. |
| 2012/0107590 A1 | 5/2012 | Xu et al. |
| 2012/0118583 A1 | 5/2012 | Johnson et al. |
| 2012/0130470 A1 | 5/2012 | Agnew |
| 2012/0145378 A1 | 6/2012 | Frazier et al. |
| 2012/0145389 A1 | 6/2012 | Fitzpatrick, Jr. |
| 2012/0168152 A1 | 7/2012 | Casciaro et al. |
| 2012/0177905 A1 | 7/2012 | Seals et al. |
| 2012/0205120 A1 | 8/2012 | Howell |
| 2012/0205872 A1 | 8/2012 | Reinhardt et al. |
| 2012/0211239 A1 | 8/2012 | Kritzler et al. |
| 2012/0234546 A1 | 9/2012 | Xu et al. |
| 2012/0234547 A1 | 9/2012 | O'Malley et al. |
| 2012/0267101 A1 | 10/2012 | Cooke |
| 2012/0292053 A1 | 11/2012 | Xu et al. |
| 2012/0318513 A1 | 12/2012 | Mazyar et al. |
| 2013/0004847 A1 | 1/2013 | Kumar et al. |
| 2013/0008671 A1 | 1/2013 | Booth et al. |
| 2013/0025409 A1 | 1/2013 | Xu |
| 2013/0029886 A1* | 1/2013 | Mazyar .................. C09K 8/54 507/270 |
| 2013/0032357 A1 | 2/2013 | Mazyar et al. |
| 2013/0048304 A1 | 2/2013 | Agrawal et al. |
| 2013/0048305 A1 | 2/2013 | Xu et al. |
| 2013/0052472 A1 | 2/2013 | Xu |
| 2013/0081814 A1 | 4/2013 | Gaudette et al. |
| 2013/0084643 A1 | 4/2013 | Commarieu et al. |
| 2013/0105159 A1 | 5/2013 | Alvarez |
| 2013/0126190 A1 | 5/2013 | Mazyar et al. |
| 2013/0133897 A1 | 5/2013 | Baihly et al. |
| 2013/0146144 A1 | 6/2013 | Joseph et al. |
| 2013/0146302 A1 | 6/2013 | Gaudette et al. |
| 2013/0168257 A1* | 7/2013 | Mazyar .................. C09K 8/54 205/261 |
| 2013/0186626 A1 | 7/2013 | Aitken et al. |
| 2013/0240200 A1 | 9/2013 | Frazier |
| 2013/0240203 A1 | 9/2013 | Frazier |
| 2013/0299185 A1 | 11/2013 | Xu et al. |
| 2013/0299192 A1 | 11/2013 | Xu et al. |
| 2013/0300066 A1 | 11/2013 | Xu et al. |
| 2013/0327540 A1 | 12/2013 | Hamid et al. |
| 2014/0014339 A1 | 1/2014 | O'Malley et al. |
| 2014/0027128 A1 | 1/2014 | Johnson et al. |
| 2014/0060834 A1 | 3/2014 | Quintero et al. |
| 2014/0116711 A1 | 5/2014 | Tang et al. |
| 2014/0262327 A1 | 9/2014 | Xu et al. |
| 2014/0360728 A1 | 12/2014 | Yashiro et al. |
| 2015/0060085 A1 | 3/2015 | Xu |
| 2015/0065401 A1 | 3/2015 | Xu et al. |
| 2013/0131966 A1 | 5/2015 | Hirano |
| 2016/0209391 A1 | 7/2016 | Zhang et al. |
| 2016/0258242 A1 | 9/2016 | Hayter et al. |

FOREIGN PATENT DOCUMENTS

| | | |
|---|---|---|
| CN | 1076968 A | 10/1993 |
| CN | 1079234 A | 12/1993 |
| CN | 1255879 A | 6/2000 |
| CN | 2658384 Y | 11/2004 |
| CN | 1668545 A | 9/2005 |
| CN | 101050417 A | 10/2007 |
| CN | 101351523 A | 1/2009 |
| CN | 101454074 A | 6/2009 |
| CN | 101457321 A | 6/2009 |
| CN | 101605963 | 12/2009 |
| CN | 101720378 A | 6/2010 |
| EP | 0033625 A1 | 8/1981 |
| EP | 1174385 A2 | 1/2002 |
| EP | 1412175 A1 | 4/2004 |
| EP | 1798301 A1 | 8/2006 |
| EP | 1857570 A2 | 11/2007 |
| FR | 2782096 A1 | 2/2000 |
| GB | 912956 A | 12/1962 |
| GB | 1046330 A | 10/1966 |
| GB | 1280833 A | 7/1972 |
| GB | 1357065 A | 6/1974 |
| JP | 61067770 A | 4/1986 |
| JP | 754008 A | 2/1995 |
| JP | 8232029 A | 9/1996 |
| JP | 2000185725 A1 | 7/2000 |
| JP | 2002053902 A | 2/2002 |
| JP | 2004225084 A | 8/2004 |
| JP | 2004225765 A | 8/2004 |
| JP | 2005076052 A | 3/2005 |
| JP | 2010502840 A | 1/2010 |
| KR | 950014350 B1 | 11/1995 |
| WO | 9909227 A1 | 2/1999 |
| WO | 9947726 A1 | 9/1999 |
| WO | 2004001087 A1 | 12/2003 |
| WO | 2004073889 A1 | 9/2004 |
| WO | 2005040068 A | 5/2005 |
| WO | 2007044635 A | 4/2007 |
| WO | 2007095376 A2 | 8/2007 |
| WO | 2008034042 A3 | 3/2008 |
| WO | 2008057045 A1 | 5/2008 |

(56) References Cited

FOREIGN PATENT DOCUMENTS

| WO | 2008079485 A2 | 7/2008 |
|---|---|---|
| WO | 2008079777 A2 | 7/2008 |
| WO | 2009079745 A1 | 7/2009 |
| WO | 2010012184 A1 | 2/2010 |
| WO | 2011071902 A2 | 6/2011 |
| WO | 2011071907 A2 | 6/2011 |
| WO | 2011071910 A2 | 6/2011 |
| WO | 2011130063 A3 | 2/2012 |
| WO | 2012015567 A2 | 2/2012 |
| WO | 2012149007 A2 | 11/2012 |
| WO | 2012174101 A2 | 12/2012 |
| WO | 2013053057 A1 | 4/2013 |
| WO | 2013078031 A1 | 5/2013 |
| WO | 2014121384 A1 | 8/2014 |

OTHER PUBLICATIONS

"Optisleeve Sliding Sleeve", [online]; [retrieved on Jun. 25, 2010]; retrieved from the Internet weatherford.com/weatherford/groups/.../weatherfordcorp/WFT033159.pdf.

Baker Hughes, "Flow Control Systems," [online]; [retrieved on May 20, 2010]; retrieved from the Internet http://www.bakerhughes.com/products-and-services/completions-and-productions/well-completions/packers-and-flow-control/flow-control-systems.

Bououdina, et al., "Comparative Study of Mechanical Alloying of (Mg+Al) and (Mg+Al+Ni) Mixtures for Hydrogen Storage", J. Alloys, Compds, 2002, 336, 222-231.

Carrejo, et al., "Improving Flow Assurance in Multi-Zone Fracturing Treatments in Hydrocarbon Reservoirs with High Strength Corrodible Tripping Balls"; Society of Petroleum Engineers; SPE Paper No. 151613; Apr. 16, 2012; 6 pages.

Coronado, "Development of an Internal Coiled Tubing Connector Utilizing Permanent Packer Technology"; Society of Petroleum Engineers, SPE Paper No. 46036; Apr. 15, 1998; 10 pages.

Garfield, New One-Trip Sand-Control Completion System that Eliminates Formation Damage Resulting From conventional Perforating and Gravel-Packing Operations:, SPE Annual Technical Conference and Exhibition, Oct. 9-12, 2005.

Gray, et al., "Protective Coatings on Magnesium and Its Alloys—a Critical Review", Journal of Alloys and Compounds 336 (2002), pp. 88-113.

Hsiao, et al., "Anodization of AZ91D Magnesium Alloy in Silicate-Containing Electrolytes"; Surface & Coatings Technology; 199; pp. 127-134; (2005).

Hsiao, et al., "Characterization of Anodic Films Formed on AZ91D Magnesium Alloy"; Surface & Coatings Technology; 190; pp. 299-308; (2005).

Huo et al.; "Corrosion of AZ91D Magnesium Alloy with a Chemical Conversion Coating and Electroless Nickel Layer"; Corrosion Science: 46; pp. 1467-1477; (2004).

Kuzumaki, et al.; "Mechanical Characteristics and Preparation of Carbon Nanotube Fiber-Reinforced Ti Composite", Advanced Engineering Materials, 2000, 2, No. 7.

Liu, et al., "Calculated Phase Diagrams and the Corrosion of Die-Cast Mg—Al Alloys", Corrosion Science, 2009, 51, 606-619.

Lunder et al.; "The Role of Mg17Al12 Phase in the Corrosion of Mg Alloy AZ91"; Corrosion; 45(9); pp. 741-748; (1989).

Majumdar, et al., "Laser Surface Engineering of a Magnesium Alloy with Al + Al2O3", Surface and Coatings Technology 179 (2004) pp. 297-305.

Murray, "Binary Alloy Phase Diagrams" Int. Met. Rev., 30(5) 1985 vol. 1, pp. 103-187.

Nie, "Patents of Methods to Prepare Intermetallic Matrix Composites: A Review", Recent Patents on Materials Science 2008, vol. 1, pp. 232-240.

Saravanan et al., "Mechanically Alloyed Carbon Nanotubes (CNT) Reinforced Nanocrystalline AA 4032: Synthesis and Characterization," Journal of Minerals & Materials Characterization & Engineering, vol. 9, No. 11, pp. 1027-1035, 2010.

Shaw, "Benefits and Application of a Surface-Controlled Sliding Sleeve for Fracturing Operations"; Society of Petroleum Engineers, SPE Paper No. 147546; Oct. 30, 2011; 8 pages.

Song, "Recent Progress in Corrosion and Protection of Magnesium Alloys"; Advanced Engineering Materials; 7(7); pp. 563-586; (2005).

Song, et al.; "A Possible Biodegradable Magnesium Implant Material," Advanced Engineering Materials, vol. 9, Issue 4, Apr. 2007, pp. 298-302.

Song, et al.; "Corrosion Behaviour of AZ21, AZ501 and AZ91 in Sodium Chloride"; Corrosion Science; 40(10); pp. 1769-1791; (1998).

Triolo et al., "Resolving the Completion Engineer's Dilemma: Permanent or Retrievable Packer?"; Society of Petroleum Engineers, SPE Paper No. 76711; May 20, 2002; 16 pages.

Vernon Constien et al., "Development of Reactive Coatings to Protect Sand-Control Screens", SPE 112494, Copyright 2008, Society of Petroleum Engineers, Presented at the 2008 SPE International Symposium and Exhibition on Formation Damage Control.

Walters, et al.; "A Study of Jets from Unsintered-Powder Metal Lined Nonprecision Small-Caliber Shaped Charges", Army Research Laboratory, Aberdeen Proving Ground, MD 21005-5066; Feb. 2001.

Wang, et al., "Contact-Damage-Resistant Ceramic/Single-Wall Carbon Nanotubes and Ceramic/Graphite Composites" Nature Materials, vol. 3, Aug. 2004, pp. 539-544.

Watanabe, et al., "Superplastic Deformation Mechanism in Powder Metallurgy Magnesium Alloys and Composites", Acta mater. 49 (2001) pp. 2027-2037.

Watarai, Trend of research and development for magnesium alloys-reducing the weight of structural materials in motor vehicles, (2006) Science and technology trends, Quaterly review No. 18, 84-97.

Welch et al., "Nonelastomeric Sliding Sleeve Maintains Long Term Integrity in HP/HT Application: Case Histories" [Abstract Only], SPE Eastern Regional Meeting, Oct. 23-25, 1996, Columbus. Ohio.

Xu, et al., "Nanostructured Material-Based Completion Tools Enhance Well Productivity"; International Petroleum Technology Conference; Conference Paper IPTC 16538; International Petroleum Technology Conference 2013; 4 pages.

Zhan, et al., "Single-wall carbon nanotubes as attractive toughening agents in alumina-based nanocomposites" Mature Materials, vol. 2, Jan. 2003, pp. 38-42.

Zhang, et al.; "Formation of metal nanowires on suspended single-walled carbon nanotubes" Applied Physics Letter, vol. 77, No. 19 (2000), pp. 3015-3017.

Zhang, et al.; "Study on the Environmentally Friendly Anodizing of AZ91D Magnesium Alloy"; Surface and Coatings Technology: 161; pp. 36-43; (2002).

Zhu, et al., "The process of coating on ultrafine particles by surface hydrolysis reaction in a fluidized bed reactor", Surface and Coatings Technology 135 (2000) 14-17.

"Baker Hughes Refines Expandable Tubular Technology with Abaqus and Isight", Simulia Realistic Simulation News, Jan./Feb. 2011, pp. 12-13.

"Reactivity series", Wikipedia, http://en.wikipedia.org/w/index.php?title=Reactivity_series&printable=yes downloaded on May 18, 2014. 8 pages.

Bakshi et al., "Carbon nanotube reinforced metal matrix composites—a review," International Materials Reviews; 2010, pp. 41-64, vol. 55, No. 1.

Birbilis, et al., "Exploring Corrosion Protection of Mg Via Ionic Liquid Pretreatment", Surface & Coatings Technology; 201, pp. 4496-4504, (2007).

Feng, et al., "Electroless Plating of Carbon Nanotubes with Silver" Journal of Materials Science, 39, (2004) pp. 3241-3243.

Lee, et al., "Effects of Ni addition on hydrogen storage properties of Mg17AL12 alloy", Materials Chemistry and Physics, 2011, 126, pp. 319-324.

Li, et al., "Investigation of aluminium-based nanocomposites with ultra-high strength", Materials Science and Engineering A, 527, pp. 305-316, (2009).

Liu, et al.; "Electroless Nickel Plating on AZ91 Mg Alloy Substrate"; Surface & Coatings Technology; 200; pp. 5087-5093; (2006).

(56) References Cited

OTHER PUBLICATIONS

Mathis, "Sand Management: A Review of Approaches and Concerns", Society of Petroleum Engineers, SPE Paper No. 82240, SPE European Formation Damage Conference, The Hague, The Netherlands, May 13-14, 2003.
Pardo, et al.; "Corrosion Behaviour of Magnesium/Aluminium Alloys in 3.5 wt% NaCl"; Corrosion Science; 50; pp. 823-834; (2008).
Quik Drill Composite Frac Plug; Baker Hughes, Baker Oil Tools; Copyright 2002; 3 pages.
Shi, et al.; "Influence of the Beta Phase on the Corrosion Performance of Anodised Coatings on Magnesium-Aluminium Alloys"; Corrosion Science; 47; pp. 2760-2777; (2005).
Shimizu, et al., "Multi-walled carbon nanotube-reinforced magnesium alloy composites", Scripta Materialia, vol. 58, Issue 4, Feb. 2008, pp. 267-270.
Shumbera, et al. "Improved Water Injector Performance in a Gulf of Mexico Deepwater Development Using an Openhole Frac Pack Completion and Downhole Filter System: Case History." SPE Annual Technical Conference and Exhibition, Oct. 5-8, 2003.
Song, et al.; "Corrosion Mechanisms of Magnesium Alloys"; Advanced Engineering Materials; 1(1); pp. 11-33; (1999).
Song, et al.; "Influence of Microstructure on the Corrosion of Diecast AZ91D"; Corrosion Science; 41; pp. 249-273; (1999).
Song, et al.; "Understanding Magnesium Corrosion"; Advanced Engineering Materials; 5; No. 12; pp. 837-858; (2003).
Sun, et al.; "Colloidal Processing of Carbon Nanotube/Alumina Composites" Chem. Mater. 2002, 14, pp. 5169-5172.
Vickery, et al.; "New One-Trip Multi-Zone Frac Pack System with Positive Positioning." European Petroleum Conference, Oct. 29-31, 2002, Aberdeen, UK. [Abstract Only].
Zeng, et al. "Progress and Challenge for Magnesium Alloys as Biomaterials," Advanced Engineering Materials, vol. 10, Issue 8, Aug. 2008, pp. B3-B14.
Zhang, et al.; "High Strength Nanostructured Materials and Their Oil Field Applications"; Society of Petroleum Engineers; Conference Paper SPE 157092; SPE International Oilfield Nanotechnology Conference, 2012; 6 pages.
Zhang, et al.; "Metal Coating on Suspended Carbon Nanotubes and its Implication to Metal—Tube Interaction", Chemical Physics Letters 331 (2000) 35-41.
"Sliding Sleeve", Omega Completion Technology Ltd, Sep. 29, 2009, retrieved on: www.omega-completion.com.
Ambat, et al., "Electroless Nickel-Plating on AZ91D Magnesium Alloy: Effect of Substrate Microstructure and Plating Parameters"; Surface and Coatings Technology; 179; pp. 124-134; (2004).
Baker Oil Tools, "Baker Oil Tools Introduces Revolutionary Sand Control Completion Technology," May 2, 2005.
Baker Oil Tools, "Z-Seal Metal-to-Metal Expandable Sealing Device Uses Expanding Metal in Place of Elastomers," Nov. 6, 2006.
Bastow, et al., "Clustering and formation of nano-precipitates in dilute aluminum and magnesium alloys", Materials Science and Engineering, 2003, C23, 757-762.
Bercegeay, et al., "A One-Trip Gravel Packing System"; Society of Petroleum Engineers, Offshort Technology Conference, SPE Paper No. 4771; Feb. 7-8, 1974.
Bybee, "One-Trip Completion System Eliminates Perforations," Completions Today, Sep. 2007, pp. 52-53.
Chang, et al., "Electrodeposition of Aluminum on Magnesium Alloy in Aluminum Chloride (A1C13)-1-ethyl-3-methylimidazolium chloride (EMIC) Ionic Liquid and Its Corrosion Behavior"; Electrochemistry Communications; 9; pp. 1602-1606; (2007).
Christoglou, et al., "Deposition of Aluminum on Magnesium by a CVD Process", Surface and Coatings Technology 184 (2004) 149-155.
Constantine, "Selective Production of Horizontal Openhole Completions Using ECP and Sliding Sleeve Technology." SPE Rocky Mountain Regional Meeting, May 15-18, 1999, Gillette, Wyoming. [Abstract Only].
Curtin, et al., "CNT-reinforced ceramics and metals," Materials Today, 2004, vol. 7, pp. 44-49.
Flahaut, et al., "Carbon Nanotube-Metal-Oxide Nanocomposites: Microstructure, Electrical Conductivity and Mechanical Properties" Acta amter. 48 (2000), pp 3803-3812.
Forsyth, et al.; "An Ionic Liquid Surface Treatment for Corrosion Protection of Magnesium Alloy AZ31"; Electrochem. Solid-State Lett. 2006 vol. 9, Issue 11, B52-B55/ 9(11); Abstract only; 1 page.
Galanty, et al. "Consolidation of metal powders during the extrusion process," Journal of Materials Processing Technology (2002), pp. 491-496.
Garfield, "Formation Damage Control Utilizing Composite-Bridge-Plug Technology for Monobore, Multizone Stimulation Operations," SPE 70004, 2001, Society of Petroleum Engineers Inc., This paper was prepared for presentation at the SPE Per.
Garfield, et al., "Maximizing Inflow Performance in Soft Sand Completions Using New One-trip Sand Control Liner Completion Technology", SPE European Formation Damage Conference, May 25-27, 2005.
Goh, et al., "Development of novel carbon nanotube reinforced magnesium nanocomposites using the powder metallurgy technique", Nanottechnology 17 (2006) 7-12.
Han, et al., "Mechanical Properties of Nanostructured Materials", Rev. Adv. Mater. Sci. 9(2005) 1-16.
Hermawan, et al., "Iron-manganese: new class of metallic degradable biomaterials prepared by powder metallurgy", Powder Metallurgy, vol. 51, No. 1, (2008), pp 38-45.
Hjortstam, et al. "Can we achieve ultra-low resistivity in carbon nanotube-based metal composites," Applied Physics A (2004), vol. 78, Issue 8, pp. 1175-1179.
Hsiao, et al., "Baking Treatment Effect on Materials Characteristics and Electrochemical Behavior of anodic Film Formed on AZ91D Magnesium Alloy"; Corrosion Science; 49; pp. 781-793; (2007).
Hsiao, et al., "Effect of Heat Treatment on Anodization and Electrochemical Behavior of AZ91D Magnesium Alloy"; J. Mater. Res.; 20(10); pp. 2763-2771;(2005).
Lavernia, et al.,"Cryomilled Nanostructured Materials: Processing and Properties", Materials Science and Engineering A, 493, (2008) pp. 207-214.
Li, "Design of Abrasive Water Jet Perforation and Hydraulic Fracturing Tool," Oil Field Equipment, Mar. 2011.
Maisano, "Cryomilling of Aluminum-Based and Magnesium-Based Metal Powders", Thesis, Virginia Tech, Jan. 13, 2006.
Seyni, et al., "On the interest of using degradable fillers in co-ground composite materials", Powder Technology 190, (2009) pp. 176-184.
Vahlas, et al., "Principles and Applications of CVD Powder Technology", Materials Science and Engineering R 53 (2006) pp. 1-72.
"Declaration of Karl T. Hartwig in Support of Petitioner Pursuant to 37 C.F.R. § 42.120", executed on Nov. 21, 2016 in support of U.S. Pat. No. 8,573,295, 52 pages.
"Declaration of Karl T. Hartwig in Support of Petitioner Pursuant to 37 C.F.R. § 42.120", executed on Nov. 21, 2016 in support of U.S. Pat. No. 9,101,978, 51 pages.
Adams, et al.; "Thermal stabilities of aromatic acids as geothermal tracers", Geothermics, vol. 21, No. 3, 1992, pp. 323-339.
Aviles et al, "Degradable Alternative to Risky Mill-Out Operations in Plug and Perf"; SPE-173695-MS; Society of Petroleum Engineers; SPE/ICOTA Coiled Tubing & Well Intervention Conference & Exhibition; Mar. 24-25, 2015; 10 Pages.
Ayman, et al.; "Effect of Consolidation and Extrusion Temperatures on Tensile Properties of Hot Extruded ZK61 Magnesium Alloy Gas Atomized Powders via Spark Plasma Sintering", Transactions of JWRI, vol. 38 (2009), No. 2, pp. 1-5.
Baker Hughes Incorporated. IN-Tallic Disintegrating Frac Balls. Houston: Baker Hughes Incorporated, 2011. Accessed Mar. 6, 2015.
Baker Hughes, "Multistage", Oct. 31, 2011, BakerHughes.com; accessed Mar. 6, 2015.
Bin et al., "Advances in Fluidization CVD Technology", East China University of Chemical Technology, China Academic Journal Electronic Publishing House, vol. 13, No. 4, Nov. 1992, pp. 360-365, English Abstract on p. 366.

(56) References Cited

OTHER PUBLICATIONS

Callister, Jr., William D., Materials Science and Engineering an Introduction, Seventh Edition, 2006, pp. 111, 627, and G7.

Chuan-Jun et al., "Study on Corrosion Kinetics of Mg-Ni alloys", Journal of Kunming University of Science and Technology, vol. 34, No. 5, pp. 10-13, Oct. 2009.

German, Randall M., Powder Metallurgy Science, Second Edition, 1994, 102 pages.

Klar, Erhard, ASM Handbook: International Metals Handbook—Powder Metallurgy, vol. 7, 1997, pp. 14, 276, and 798.

Lin et al., "Processing and Microstructure of Nano-Mo/Al2O3 Composites from MOCVD and Fluidized Bed", Nanostructured Materials, Nov. 1999, vol. 11, No. 8, pp. 1361-1377.

Petition for Inter Partes Review; Case No. IPR2017-00326; U.S. Pat. No. 9,101,978; Nov. 23, 2016; 46 pages.

Petition for Inter Partes Review; Case No. IPR2017-00327; U.S. Pat. No. 8,573,295; Nov. 23, 2016; 53 pages.

Reid, Gary Carl, "Literature evaluation of induced groundwater tracers, field tracer techniques, and hydrodynamic Dispersion values in porous media", Theisis in Geosciences (Masters), Texas Tech University, Aug. 1981, 109 pages.

Rose, et al.; "The application of the polyaromatic sulfonates as tracers in geothermal reservoirs", Geothermics 30 (2001) pp. 617-640.

Saravanan et al, "Mechanically Alloyed Carbon Nanotubes (CNT) Reinforced Nanocrystalline AA 4032: Synthesis and Characterization", Journal of Minerals and Materials Characterization and Engineering, vol. 9, No. 11 pp. 1027-1035 2010.

Schaffer, James P. et al., The Science and Design of Engineering Materials, Second Edition, 1999, pp. 122, 123, 598, and 699.

Shigematsu, et al., "Surface Treatment of AZ91D Magnesium Alloy by Aluminum diffusion Coating", Journal of Materials Science Letters 19, 2000, pp. 473-475.

Singh, et al., "Extended Homogeneity Range of Intermetallic Phases in Mechanically Alloyed Mg—Al Alloys", Elsevier Sciences Ltd., Intemetallics 11, 2003, pp. 373-376.

Spencer et al., "Fluidized Bed Polymer Particle ALD Process for Producing HDPE/Alumina Nanocomposites", The 12th International Conference on Fluidization—New Horizons in Fluidization Engineering, vol. RP4 (2007).

Stanley, et al.; "An Introduction to Ground-Water Tracers", Department of Hydrology and Water Resources, University of Arizona, Mar. 1985, pp. 1-219.

Tsipas et al. "Effect of High Energy Ball Milling on Titanium-Hydroxyapatite Powders" Powder Metallurgy, Maney Publishing, London, GB, vol. 46, No. 1, Mar. 2003 (Mar. 2003), pp. 73-77.

Xie, Guoqiang et al., "TEM Observation of Interfaces between Particles in Al—Mg Alloy Powder Compacts Prepared by Pulse Electric Current Sintering", Materials Transactions, 2002, pp. 2177-2180, vol. 43-No. 9.

Zemel, "Tracers in the Oil Field", University of Texas at Austin, Center for Petroleum and Geosystems, Jan. 1995, Chapters 1, 2, 3, 7.

\* cited by examiner

METHOD OF CONTROLLING THE CORROSION RATE OF ALLOY PARTICLES, ALLOY PARTICLE WITH CONTROLLED CORROSION RATE, AND ARTICLES COMPRISING THE PARTICLE

CROSS REFERENCE TO RELATED APPLICATIONS

This application is a continuation of U.S. Non-provisional application Ser. No. 13/779,856 filed on Feb. 28, 2013, which is a divisional of U.S. Non-provisional application Ser. No. 13/194,271 filed on Jul. 29, 2011. The parent applications are incorporated by reference herein in their entireties.

BACKGROUND

Certain downhole operations involve placement of elements in a downhole environment, where the element performs its function, and is then removed. For example, elements such as ball/ball seat assemblies and fracture (frac) plugs are downhole elements used to seal off lower zones in a borehole in order to carry out a hydraulic fracturing process (also referred to in the art as "fracking") to break up different zones of reservoir rock. After the fracking operation, the ball/ball seat or plugs are then removed to allow fluid flow to or from the fractured rock.

Balls and/or ball seats, and frac plugs, may be formed of a corrodible material so that they need not be physically removed intact from the downhole environment. In this way, when the operation involving the ball/ball seat or frac plug is completed, the ball, ball seat, and/or frac plug corrodes away. Otherwise, the downhole article may have to remain in the hole for a longer period than is necessary for the operation.

To facilitate removal, such elements may be formed of a material that reacts with the ambient downhole environment so that they need not be physically removed by, for example, a mechanical operation, but may instead corrode or dissolve under downhole conditions. However, while corrosion rates of, for example, an alloy used to prepare a corrodible article can be controlled by adjusting alloy composition, an alternative way of controlling the corrosion rate of a downhole article is desirable.

Corrodible materials may include those having a high activity on the saltwater galvanic series, such as a magnesium alloy adjusted for corrosion rate. It has been found that adjusting the amount of trace contaminants in a magnesium alloy can have a significant impact on the corrosion rate of such alloys (Song, G. and Atrens, A., "Understanding Magnesium Corrosion: A Framework for Improved Alloy Performance," *Adv. Eng. Mater.* 2003, 5(12) pp. 837-858). For example, metals such as nickel, iron, copper, calcium, etc., may be added to magnesium to increase the corrosion rate and other metals such as zirconium, yttrium, etc. may be added to decrease the corrosion rate. Balancing the amounts of such additives to achieve a desired bulk corrosion rate can in this way control overall corrosion of articles made from the alloy; however, such an approach requires preparation of multiple batches of alloy, requiring high batch-to-batch reproducibility and precise, reproducible control of metal additives or contaminants in the alloy.

There accordingly remains a need for controlling the overall corrosion rate of magnesium alloys for use in downhole articles without need for fine adjustment of alloy composition and with improved corrosion control.

SUMMARY

The above and other deficiencies of the prior art are overcome by, in an embodiment, a composite particle comprising a core, a shielding layer deposited on the core, and further comprising an interlayer region formed at an interface of the shielding layer and the core, the interlayer region having a reactivity less than that of the core, and the shielding layer having a reactivity less than that of the interlayer region, a metallic layer not identical to the shielding layer and deposited on the shielding layer, the metallic layer having a reactivity less than that of the core, and optionally, an adhesion metal layer deposited on the metallic layer.

In another embodiment, a composite particle comprises a magnesium-aluminum alloy core, a shielding layer comprising an aluminum-containing layer deposited on the core, and further comprising an interlayer region comprising α-Mg and γ-$Mg_{17}Al_{12}$ formed at the interface between the magnesium alloy core and the aluminum-containing layer, and further comprising inclusions of alumina, magnesia, or a combination comprising at least one of these oxides, a metallic layer deposited on the shielding layer, the metallic layer comprising Ni, Fe, Cu, Co, W, alloys thereof, or a combination comprising at least one of the foregoing, an aluminum-containing shielding layer deposited on the metallic layer, and optionally, an aluminum-containing adhesion metal layer, wherein the interlayer region, shielding layer, metallic layer, and optional adhesion metal layer are inter-dispersed with each other.

In another embodiment, a method of adjusting corrosion rate in an aqueous electrolyte is disclosed for a composite particle having a core, a shielding layer deposited on the core, and further comprising an interlayer region formed at an interface of the shielding layer and the core, the interlayer region having a reactivity less than that of the core, and the shielding layer having a reactivity less than that of the interlayer region, a metallic layer not identical to the shielding layer and deposited on the shielding layer, the metallic layer having a reactivity less than that of the core, and optionally, an adhesion metal layer deposited on the metallic layer, the method comprising selecting the metallic layer such that the lower the reactivity of the metallic layer is relative to the shielding layer, the greater the corrosion rate, and selecting the amount, thickness, or both amounts and thicknesses of the shielding layer and metallic layer such that the less the amount, thickness, or both amount and thickness of the shielding layer relative to those of the metallic layer, the greater the corrosion rate.

BRIEF DESCRIPTION OF THE DRAWINGS

Referring now to the drawings wherein like elements are numbered alike in the several Figures.

DETAILED DESCRIPTION OF THE INVENTION

Figure 1A:
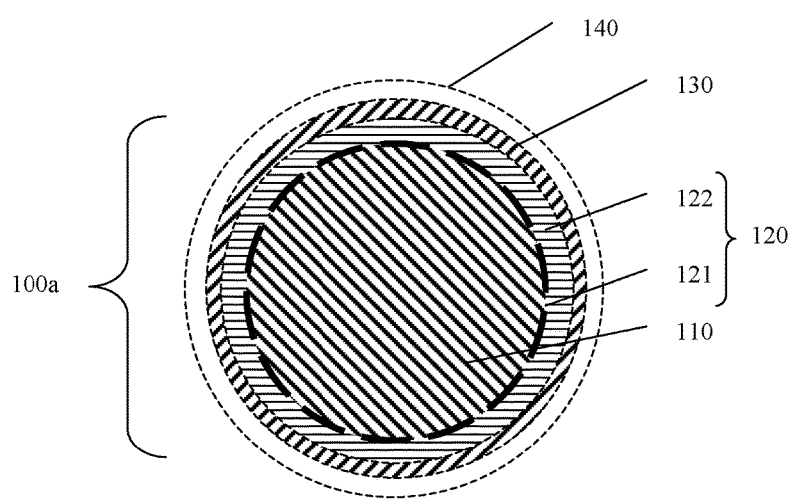
FIG. 1A shows a cross-sectional view of a composite particle 100*a* having a multilayer structure and FIG. 1B shows a cross-sectional view of a composite particle 100*b* having an inter-dispersed layer.

Disclosed herein is a composite particle useful for fabricating a corrodible article. The composite particle has multilayered structure of a core of a high reactivity material, such as magnesium or a magnesium alloy, coated a shielding layer such as for example, aluminum. At the interface of the shielding layer and the core, an intermetallic phase can form, such as a crystalline metallic compound of magnesium and aluminum, and present in discontinuous regions. The shielding layer, which includes the intermetallic regions, has a layer of a noble material with a lower reactivity (i.e., more noble than the shielding layer, though comparable in reactivity to the intermetallic phase) disposed on it. An additional layer of an adhesive metal, for example, aluminum, can be disposed over the noble material layer, to provide adhesion between particles upon molding. The interlayer region, shielding layer, noble material layer (referred to herein as the "metallic layer" where the noble material is a metal), and optional adhesion layer are believed to be inter-dispersed with each other, and form a compositionally varied outer shell which is also inter-dispersed with the core.

The noble material layer, which has a lower reactivity relative to the core material, acts as a cathode, whereas the core, made of a metal such as magnesium which is more reactive than the noble metal layer, is anodic relative to the noble metal layer. The shielding layer, which includes the intermetallic phase, is also cathodic relative to the core, but anodic relative to the noble metal layer. A galvanic discharge cycle (e.g., corrosion) occurs between the relatively anodic and relatively cathodic materials in the presence of an electrolyte. By adjusting the composition of the noble metal layer relative to the core and shielding layers, and by adjusting the amounts and/or thicknesses of the shielding and noble metal layers, the corrosion rate of the composite particle is adjusted.

The composite particles are formed into articles by compressing and shaping the particles using, for example, cold molding followed by forging.

The core includes any material suitable for use in a downhole environment, provided the core is corrodible in the downhole environment relative to a second material having a different reactivity. In an embodiment, the composite particle thus includes a magnesium-containing core. A magnesium-containing core includes any such alloy which is corrodible in a corrosive environment including those typically encountered downhole, such as an aqueous environment which includes salt (i.e., brine), or an acidic or corrosive agent such as hydrogen sulfide, hydrochloric acid, or other such corrosive agents. Magnesium alloys suitable for use include alloys of magnesium (Mg) with aluminum (Al), cadmium (Cd), calcium (Ca), cobalt (Co), copper (Cu), iron (Fe), manganese (Mn), nickel (Ni), silicon (Si), silver (Ag), strontium (Sr), thorium (Th), zinc (Zn), zirconium (Zr), or a combination comprising at least one of these elements. Particularly useful alloys include magnesium alloy particles including those prepared from magnesium alloyed with Ni, W, Co, Cu, Fe, or other metals. Alloying or trace elements can be included in varying amounts to adjust the corrosion rate of the magnesium. For example, four of these elements (cadmium, calcium, silver, and zinc) have mild-to-moderate accelerating effects on corrosion rates, whereas four others (copper, cobalt, iron, and nickel) have a still greater accelerating effect on corrosion. Exemplary commercially available magnesium alloys and which include different combinations of the above alloying elements to achieve different degrees of corrosion resistance include but are not limited to, for example, magnesium alloyed with aluminum, strontium, and manganese such as AJ62, AJ50x, AJ51x, and AJ52x alloys, and magnesium alloyed with aluminum, zinc, and manganese which include AZ91A-E alloys.

It will be appreciated that alloys having corrosion rates greater than those of the above exemplary alloys are contemplated as being useful herein. For example, nickel has been found to be useful in decreasing the corrosion resistance (i.e., increases the corrosion rate) of magnesium alloys when included in amounts of less than or equal to about 0.5 wt %, specifically less than or equal to about 0.4 wt %, and more specifically less than or equal to about 0.3 wt %, to provide a useful corrosion rate for the corrodible downhole article. In another embodiment, the magnesium-containing core comprises a magnesium-aluminum alloy.

Particle sizes for the magnesium alloy cores may be from about 50 to about 150 micrometers ($\mu m$), more specifically about 60 to about 140 $\mu m$, and still more specifically about 70 to about 130 $\mu m$. Useful magnesium alloys may include combinations of the above elements and/or contaminants sufficient to achieve a corrosion rate for the magnesium alloy core of about 0.1 to about 20 mg/cm$^2$/hour, specifically about 1 to about 15 mg/cm$^2$/hour using aqueous 3 wt % KCl solution at 200° F. (93° C.).

The composite particle includes a shielding layer. The shielding layer is formed by depositing on the core, a material having a lower reactivity than that of the core. In an exemplary embodiment, the shielding layer is an aluminum-containing layer deposited on the core. In an embodiment, the core is a magnesium alloy core and the shielding layer is an aluminum-containing layer. As used herein "on" and "deposited on" mean that a layer may or may not be in direct contact with, the underlying surface to which the layer is applied, unless otherwise specified as by stating that the layers are at least partially in contact. It will be further understood that "deposited" and "depositing," when used in with respect to a method, indicates the action of deposition, whereas "deposited" when used in the context of a composition or article, merely indicates the juxtaposition of the layer with respect to the substrate and does not indicate a process of deposition. The shielding layer further comprises an interlayer region formed at the interface of the core and shielding layer, which is compositionally derived from the core and shielding layers. In an embodiment, the interlayer region forms at the boundary of a magnesium-containing core and an aluminum-containing shielding layer, and the interlayer region comprises an intermetallic compound. For example, magnesium-aluminum alloys include an α-Mg phase, and in addition, a $\gamma$-$Mg_{17}Al_{12}$ intermetallic phase which accumulates at the grain boundaries within the Mg—Al alloy. The intermetallic $\gamma$-$Mg_{17}Al_{12}$ phase is generally present in amounts of less than 30 wt % of the Mg—Al alloy. Depending upon the composition, additional phases can also be present, including solid solution Al, and other intermetallic phases such as β-$Mg_2Al_3$. Upon deposition of the aluminum-containing shielding layer, the $\gamma$-$Mg_{17}Al_{12}$ phase forms and accumulates as well at the interface of the shielding layer and the Mg-containing core. Thermal treatment can accelerate the formation of the interlayer region. For example, heating at temperatures less than the eutectic point (e.g., less than or equal to about 450° C., depending on the alloy composition, and as long as the eutectic point is not exceeded) for about 15 minutes can form an intermetallic phase at the interface of the Mg-containing core and the Al-containing layer. The composite particle thus includes, as part of the interlayer region, the intermetallic compound $\gamma\text{-}Mg_{17}Al_{12}$. The interlayer region forms over the entire contacting area of the Mg-containing core and the Al-containing layer, or a portion of the contacting areas. Deposition method and any heat treating can be adjusted so that the intermetallic phase intervenes between a portion of contacting surfaces of the Mg alloy core and the Al-containing layer. The shielding layer further includes an oxide of one or more of the metals of which the core and/or shielding layers are comprised. For example, where the core comprises magnesium or a magnesium-aluminum alloy, and the shielding layer comprises aluminum, the shielding layer optionally includes oxides of magnesium (such as magnesia), aluminum (such as alumina), or a combination comprising at least one of the foregoing.

The composite particle further includes a metallic layer not identical to the shielding layer and deposited on the shielding layer. The metallic layer has a lower reactivity relative to the core, based on the saltwater galvanic series from lower reactivity (i.e., more noble metals) to high reactivity (i.e., less noble metals). In an embodiment, the metal(s) used for the metallic layer allow for the formation of hydrogen when used as a cathode in an electrochemical cell. The metallic layer thus comprises a group 6-11 transition metal. Specifically, the group 6-11 transition metal includes Ni, Fe, Cu, Co, W, alloys thereof, or a combination comprising at least one of the foregoing.

The composite particle optionally includes an adhesion layer deposited on the metallic layer. The adhesion layer comprises a material which promotes adhesion between the composite particles. An exemplary adhesion layer includes aluminum or an aluminum alloy. Upon compressing and forging of the adhesion layer-coated composite particles to form a molded article, the particles bind to one another through interparticle contact via the material of the adhesion layer, to further provide mechanical strength to the article.

The layers (shielding layer, metallic layer, and optional adhesion layer) may each have an average thickness of about 0.05 to about 0.15 μm, and specifically about 0.07 to about 0.13 μm. In an embodiment, each layer does not completely cover the underlying layer, and the layer coverage is thus discontinuous. Furthermore, where the layers are "on" one another, interstitial spaces at the interfaces of the layers may be present. In an embodiment, the interlayer region, shielding layer, metallic layer, and optional adhesion metal layer are inter-dispersed with each other. As used herein, "inter-dispersed" mean that two or more adjacent layers interpenetrate into or through each other in intimate admixture, where it will be appreciated that two (or more) inter-dispersed layers have, on average, a compositional gradient due to the interpenetration of one layer into the adjacent layer.

The core and shielding layer, shielding layer and metallic layer, and metallic layer and optional adhesion layer, are each thus in mutual partial contact, and are inter-dispersed, such that components of the core, the shielding layer, and the metallic layer are present at the exposed surface of the composite particle.

In an embodiment, the composite particles have a corrosion rate of about 0.1 to about 20 mg/cm²/hour, specifically about 1 to about 15 mg/cm²/hour using an aqueous 3 wt % KCl solution at 200° F. (93° C.).

In a specific embodiment, the shielding layer is an aluminum-containing layer, and the core is a magnesium-containing core. In an embodiment, the shielding layer comprises aluminum. In another embodiment, the shielding layer further comprises, in addition to aluminum, inclusions of alumina, magnesia, or a combination comprising at least one of these oxides. The shielding layer further includes an interlayer region formed at the interface between the magnesium alloy core and the first aluminum-containing layer. In an embodiment, the interlayer region comprises $\gamma\text{-}Mg_{17}Al_{12}$.

Also in a specific embodiment, the metallic layer comprises a group 6-11 transition metal on the shielding layer. The group 6-11 transition metal includes Ni, Fe, Cu, Co, W, alloys thereof, or a combination comprising at least one of the foregoing.

Optionally, in a specific embodiment, the adhesion layer is an aluminum-containing layer deposited on the metallic layer.

Deposition of the shielding, metallic, and adhesion layers on the core is not particularly limited. Where either or both of the shielding and optional adhesion layers includes aluminum or an aluminum alloy, uniformly depositing the aluminum layer(s) on a magnesium alloy core particle is accomplished in one exemplary embodiment by decomposition of an organometallic compound, such as triethylaluminum (having a boiling point of 128-130° C. at 50 mm Hg), after introducing the organometallic compound into a fluidized bed reactor containing the magnesium alloy core particles to deposit the shielding layer, or the introducing the organometallic compound into a reactor containing magnesium alloy core/shielding layer/metallic layer particles to deposit the adhesion layer. The interlayer region, which in this case includes an intermetallic compound such as $\gamma\text{-}Mg_{17}Al_{12}$, further forms at the interface of the Mg alloy core and the shielding layer by a thermal treatment, such as sintering and/or annealing, and/or forging of an article molded from the composite particles, at a temperature below the melting point of all or part of the composite particle.

Similarly, depositing a uniform metallic layer is also not particularly limited, and may be accomplished by, for example, decomposition of an organometallic compound (such as nickel carbonyl where the metallic layer is nickel) after introducing the organometallic compound into a fluidized bed reactor containing the magnesium alloy core particles coated with the shielding layer.

The core can also be coated with materials for the shielding layer, metallic layer, and optional adhesion layer using a physical mixing method. For example, the core can be admixed with one or more components of the shielding layer, metallic layer, and optional adhesion layer by cryomilling, ball milling, or the like. In this way, the shielding, metallic layer and adhesion layer components can be included sequentially, or components for two or all three layers included simultaneously. Combinations of deposition methods including vapor phase deposition and physical methods can also be used to provide the composite particles. Where all components are included by physical mixing simultaneously, it will be appreciated that a single layer is formed which is a composite of the shielding layer, metallic layer, and adhesion layer components.

In another embodiment, the core comprises an inner core of a first core material and an outer core of a second core material, the inner core material having a lower reactivity than that of the outer core. The inner core is any material useful for depositing thereon a high reactivity material such as magnesium, without limitation. The inner core can thus be any suitable, low reactivity material, such as a 6-11 transition metal including Ni, Fe, Cu, Co, W, alloys thereof, or a combination comprising at least one of the foregoing; a metal oxide such as alumina, silica, silicates, iron oxides, titania, tungstates, and the like; a polymer including a phenolic polymer; ceramics; glasses; or other such materials. In an exemplary embodiment, the inner core comprises an aluminum alloy, nickel, iron, alumina, titania or silica, and the outer core comprises magnesium or a magnesium alloy as described hereinabove. The outer core is deposited on the inner core using any suitable deposition method such as physical vapor deposition (PVD) of the metallic magnesium or magnesium alloy in a fluidized bed reactor. The core structure having inner and outer cores is then coated with shielding layer, metallic layer, and optional adhesion layer as described above to form the composite particle.

The composite particle generally has a particle size of from about 50 to about 150 micrometers (μm), and more specifically about 60 to about 140 μm.

In another embodiment, a method of adjusting corrosion rate of a composite particle, or article prepared therefrom, is disclosed. In an embodiment, adjusting is accomplished by either or both of selecting the composition of the metallic layer to have the desired reactivity, where the lower the reactivity of the metallic layer relative to the shielding layer (and by definition, to both the core and interlayer region), the faster the corrosion rate; and conversely, the higher the reactivity of the metallic layer relative to the shielding layer, the slower the corrosion rate. Alternatively or in addition, in an embodiment, adjusting is accomplished by increasing the amount and/or thickness of the shielding layer for any given amount and/or thickness of metallic layer. It will further be appreciated that additional control of the corrosion rate is accomplished by the degree of inter-dispersion of the core, interlayer region, shielding layer, and metallic layer, where the more highly inter-dispersed these layers are, the greater the corrosion rate, and conversely, the less inter-dispersed the layers, the slower the corrosion rate. Thus, amount and thickness as used herein are related in that the higher the amount of a layer, expressed as weight percent based on the weight of the composite particle, the greater the thickness.

The surface of the composite particles includes both anodic and cathodic regions of the inter-dispersed layers. It will be understood that "anodic regions" and "cathodic regions" are relative terms, based on the relative reactivity of the inter-dispersed materials. For example as discussed above, magnesium (from the core) is anodic relative to the cathodic intermetallic compound of the interlayer region ($\gamma$-$Mg_{17}Al_{12}$) and cathodic aluminum from the interlayer region/shielding layer, and anodic relative to nickel from the cathodic metallic layer. Similarly, intermetallic compound ($\gamma$-$Mg_{17}Al_{12}$) is anodic relative to cathodic aluminum from the shielding layer, and anodic relative to nickel from the cathodic metallic layer; and aluminum from the shielding layer is anodic relative to nickel from the metallic layer.

In this way, upon exposure of the surface of the composite particle (and any article made from the composite particles) to an electrolyte, multiple localized corrosion mechanisms take place in which reversal of anodic and cathodic regions occur. For example, after exposed anodic core material (such as magnesium) is corroded, a previously cathodic material (such as intermetallic compound or aluminum in the shielding layer) becomes anodic and is corroded by interaction with the more cathodic metallic layer (e.g., which includes nickel, etc.). As the surface corrodes away and new, more anodic core material such as magnesium is exposed, the situation again reverses and the aluminum or intermetallic compound becomes cathodic toward the core material.

As corrosion advances in localized regions on the surface between anodic and cathodic regions in the presence of an electrolyte fluid (water, brine, etc.), these regions, referred to herein as micro-cells, can corrode outward over the surface of the composite particle and link to other micro-cells to form larger corrosion regions, which in turn can link to other corrosion regions, etc., as further anodic materials such as magnesium (from the core) or intermetallic $\gamma$-$Mg_{17}Al_{12}$ (from the interlayer region/shielding layer) is exposed. After these regions corrode, new, underlying anodic materials from the core are exposed to the electrolyte. Upon corroding, these inter-dispersed layers can thus become permeable to the electrolyte fluid. This allows percolation of electrolytic fluids into the corroding surface to penetrate and undermine the layers, and the process repeats until the corrodible materials are consumed. It will be appreciated that the presence of metal oxides at the core/shielding layer interface also decreases the corrosion rate of the core at the interface by acting as an inert barrier, and thus affects the relative anodic/cathodic character of the micro-cell (for example, where alumina and/or magnesia are present between a magnesium core and the intermetallic compound, the intermetallic compound is insulated from the core and will be anodic relative to the metallic layer). In this way, the presence of inclusions of metal oxides affects the overall corrosion rate of the composite particle.

Where the core comprises an inner and outer core in which the outer core is anodic, corrosion advances until only the inner core remains. The inner core thus exposed no longer has the structural integrity and cohesiveness of the composite particle, and disperses into the surrounding fluid as a suspension of particles, and can be removed in this way.

Thus, in an embodiment, a method of adjusting corrosion rate in a composite particle includes selecting the metallic layer such that the lower the reactivity of the metallic layer is relative to the shielding layer, the greater the corrosion rate. In another embodiment, a method of adjusting corrosion rate in a composite particle includes selecting the amount, thickness, or both amounts and thicknesses of the shielding layer and the metallic layer such that the less the amount, thickness, or both amount and thickness of the shielding layer are relative to those of the metallic layer, the greater the corrosion rate. The interlayer region, shielding layer, metallic layer, and optional adhesion metal layer being inter-dispersed with each other, and have compositions as discussed above.

In another embodiment, an article comprises the composite particles which may be provided as a powder or other suitable form such as a pre-compressed pellet. Articles may be prepared from the composite particle by compressing or otherwise shaping the composite particles, to form an article having the appropriate shape. For example, the composite particles are molded or compressed into the desired shape by cold compression using an isostatic press at about 40 to about 80 ksi (about 275 to about 550 MPa), followed by forging or sintering and machining, to provide an article having the desired shape and dimensions. As disclosed herein, forging or sintering is carried out at a temperature below that of the melting point of the components.

Thus, a method of forming an article comprises molding the composite particles and forging the molded article.

The article so prepared is referred to as a controlled electrolytic material (CEM) article, and useful under downhole conditions. Articles include, for example a ball, a ball seat, a fracture plug, or other such downhole article. However, it should be understood that though these articles are disclosed, there are other uses for the composite particles in powder form. For example, the composite particles may be included in a matrix that is non-metallic, and may be applied to a surface as a coating, such as a paint, powder coating, etc., where a controlled electrolytic process occurs in the presence of water, and preferably, water plus an electrolyte. Such processes may include coatings for marine applications such as drill rigs, boat or ship hulls, undersea tools, or other such applications. Such an electrolytic material may provide a sacrificial layer to mitigate or prevent corrosion of an underlying metal layer, or may alternatively prevent adhesion of, for example, marine organisms to the underwater surface coated with the composite particles.

Figure 1B:
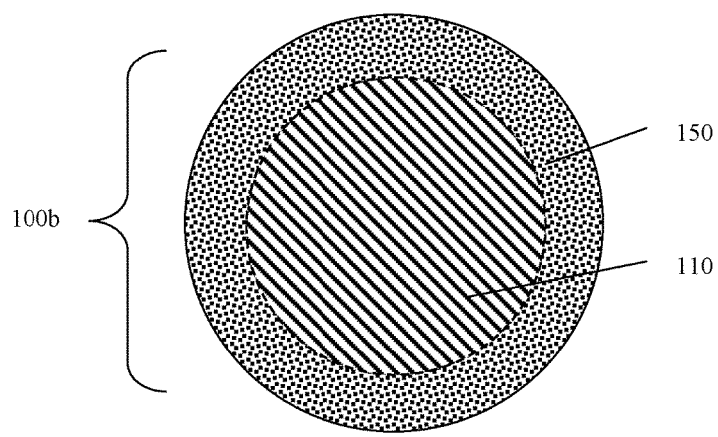

An exemplary use is described herein. FIGS. 1A and 1B show in schematic cross-section different structural variants of the composite particles 100a and 100b. In FIG. 1A, the composite particle 100a includes a core 110; a shielding layer 120 which includes an intermetallic region 121 (heavy dashed line) and aluminum layer 122 surrounding the intermetallic region; a metallic layer 130, and optionally, a second aluminum layer 140 which functions as an adhesion layer. This adhesion layer 140 may be included to promote the adhesion of particles when compressed together to form a shaped article. It will be appreciated that the layers, while shown as discrete core-shell layers, can also be intermixed at the interfaces and/or the layers can be discontinuous on the surfaces to which they are applied, such that core 110 is actually in contact with shielding layer 120 and/or metallic layer 130 and/or adhesion layer 140.

In FIG. 1B, composite particle 100b has a core 110 and an inter-dispersed layer 150 which includes the components of the interlayer region, shielding layer, metallic layer, and optional adhesion layer (not shown individually in FIG. 1B). It will be appreciated that such an inter-dispersed structure can derive from a discontinuous core-shell structure as described in FIG. 1A, and in which inter-dispersion is enhanced by thermal treatment (e.g., sintering); or the inter-dispersed structure can derive from a physical method of forming the particles (e.g., cryo- or ball-milling) or by including precursor materials for more than one layer into a fluidized bed reactor during layer formation. The inter-dispersed layer 150 is homogeneously inter-dispersed with the components of the different layers (interlayer region, shielding layer, metallic layer) equally distributed throughout inter-dispersed layer 150, or is non-uniformly distributed, for example, in a gradient where the composition changes from predominantly interlayer region composition at the interface of inter-dispersed layer 150 and core 110, to predominantly adhesion layer composition at the outer surface of inter-dispersed layer 150.

Figure 2A:
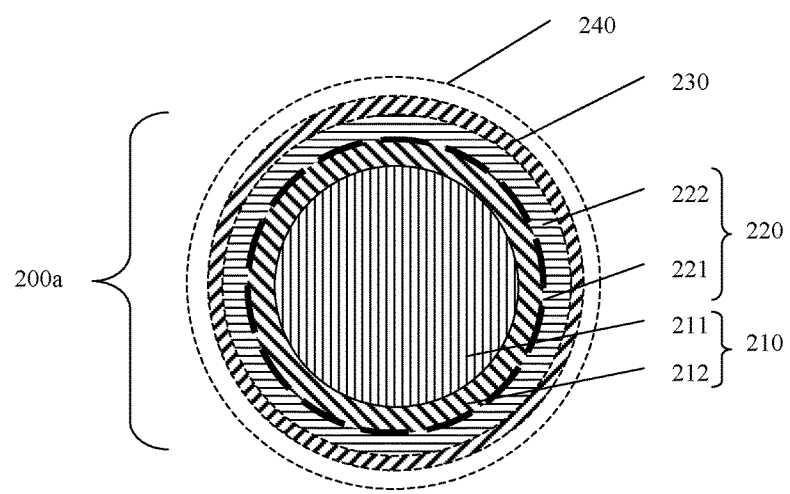
FIG. 2A shows a cross-sectional view of a composite particle 200*a* having a multilayer structure and FIG. 2B shows a cross-sectional view of a composite particle 200*b* having an inter-dispersed layer.
Figure 2B:
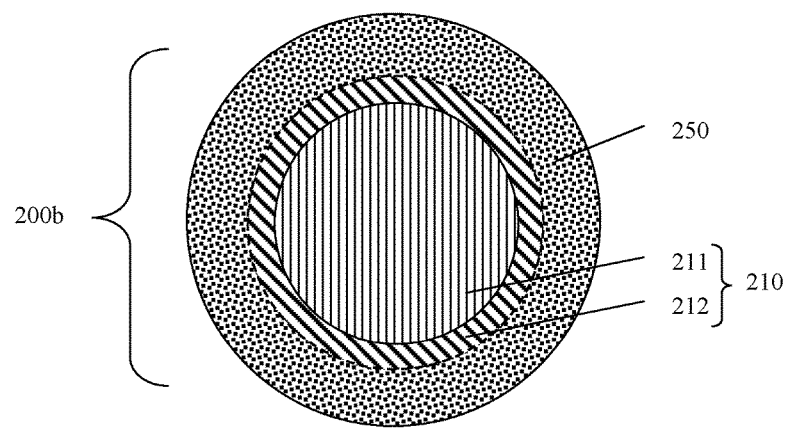

FIGS. 2A and 2B show, similar to FIGS. 1A and 1B, cross-sectional views of different structural variants of the composite particles 200a and 200b. In FIG. 2A, the composite particle 200a includes a core 210 comprising inner core 211 and outer core 212; a shielding layer 220 which includes an intermetallic region 221 (heavy dashed line) and aluminum layer 222 surrounding the intermetallic region; a metallic layer 230, and optionally, a second aluminum layer 240 which functions as an adhesion layer. As in FIG. 1A, it will be appreciated that the layers, while shown as discrete core-shell layers, can also be intermixed at the interfaces and/or the layers can be discontinuous on the surfaces to which they are applied.

In FIG. 2B, composite particle 200b has a core 210 comprising inner core 211 and outer core 212 and an inter-dispersed layer 250 which includes the components of the interlayer region, shielding layer, metallic layer, and optional adhesion layer (not shown individually in FIG. 2B). As in FIG. 1B, it will be appreciated that such an inter-dispersed structure can derive from a discontinuous core-shell structure, from milling to form the particles, or by including precursor materials for more than one layer into a fluidized bed reactor during layer formation. Also as in FIG. 1B, the composition of inter-dispersed layer 250 is homogeneously distributed, or is non-uniformly distributed, such as for example, in a gradient.

Figure 3:
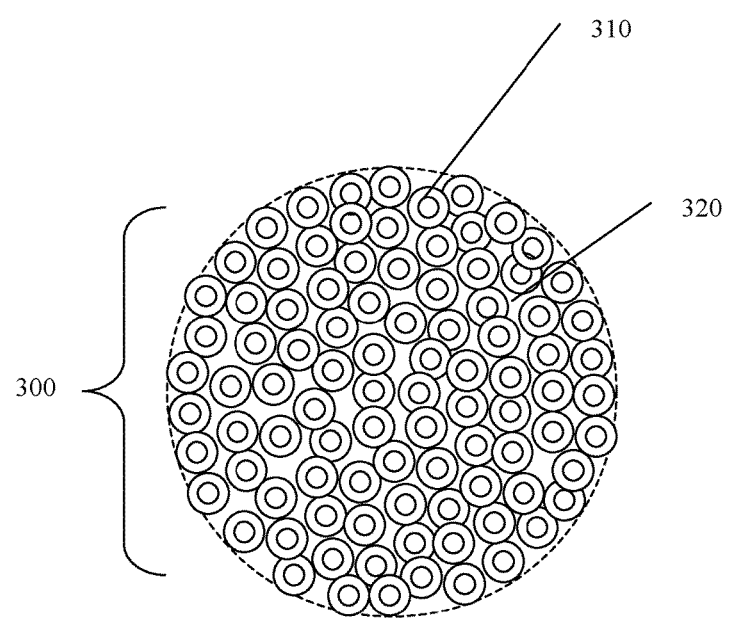
FIG. 3 shows a cross-sectional view of an exemplary corrodible downhole article 300 prepared from the composite particles 310.

In FIG. 3, as an exemplary article, a ball 300 is shown. In FIG. 3, the ball 300 is composed of composite particles 310. During cold compacting to form ball 300, the powdered composite particles 310 are compressed into and shaped to form the spherical ball 300 with interstitial spaces 320, where the interstitial spaces 320 are further reduced in volume by forging and/or sintering to reduce free volume from about 20% after compacting to less than about 5%, specifically less than about 3%, and still more specifically less than about 1% after forging/sintering. When used in conjunction with a ball seat (not shown) and seated in the ball seat to prevent fluid flow past the ball/ball seat, ball 300 forms a downhole seal for isolating, for example, a fracture zone located below the ball/ball seat assembly.

While one or more embodiments have been shown and described, modifications and substitutions may be made thereto without departing from the spirit and scope of the invention. Accordingly, it is to be understood that the present invention has been described by way of illustration and not limitation.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorant). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A method of forming a composite, the method comprising:
   depositing
   a first aluminum-containing layer, on
   a magnesium alloy core comprising magnesium alloyed with one or more of the following: Al; Cd; Ca; Co; Cu; Fe; Mn; Ni; Si; Ag; Sr; Th; Zn; Zr; or W,
   to form a shielding layer, the shielding layer further comprising an interlayer formed at the interface between the magnesium alloy core and the first aluminum-containing layer;

depositing a metallic layer on the shielding layer; the metallic layer comprising Ni, Fe, Cu, Co, W, alloys thereof, or a combination comprising at least one of the foregoing; and optionally, depositing an adhesion metal layer on the metallic layer to form a composite particle; the adhesion metal layer comprising aluminum;

wherein the core and shielding layer, shielding layer and metallic layer, and metallic layer and optional adhesion metal layer, are each in mutual partial contact such that components of the core, the shielding layer, and the metallic layer are present at an exposed surface of the composite particle.

2. The method of claim 1, wherein the interlayer region, shielding layer, metallic layer, and optional adhesion metal layer are inter-dispersed with each other.

3. The method of claim 1, wherein the shielding layer comprises aluminum, and inclusions of alumina, magnesia, or a combination comprising at least one of the foregoing oxides; and the interlayer region comprises an intermetallic compound.

4. The method of claim 3, wherein the intermetallic compound is $\gamma\text{-}Mg_{17}Al_{12}$.

5. The method of claim 1, wherein the core comprises an inner core of a first core material and an outer core of a second core material, the inner core material having a lower activity than that of the outer core.

6. The method of claim 5, wherein the inner core comprises aluminum, and the outer core comprises magnesium.

7. The method of claim 1, wherein the core comprises a magnesium-aluminum alloy.

8. The method of claim 1, wherein the shielding layer is cathodic relative to the core and anodic relative to the metallic layer.

9. A method of forming a composite, the method comprising:

depositing
a first aluminum-containing layer comprising aluminum and inclusions of alumina, magnesia, or a combination comprising at least one of these oxides, on
a magnesium-aluminum alloy core,
to form a shielding layer, the shielding layer further comprising an interlayer comprising $\gamma\text{-}Mg_{17}Al_{12}$ formed at the interface between the magnesium alloy core and the first aluminum-containing layer; and depositing a metallic layer on the shielding layer; the metallic layer comprising Ni, Fe, Cu, Co, W, alloys thereof, or a combination comprising at least one of the foregoing; and optionally, depositing an adhesion metal layer on the metallic layer to form a composite particle;

wherein the core and shielding layer, shielding layer and metallic layer, and metallic layer and optional adhesion metal layer, are each in mutual partial contact such that components of the core, the shielding layer, and the metallic layer are present at an exposed surface of the composite particle.

10. The method of claim 9, wherein the interlayer region, shielding layer, metallic layer, and optional adhesion metal layer are inter-dispersed with each other.

11. The method of claim 9, further comprising molding a plurality of the composite particles.

12. The method of claim 11, further comprising forging the molded composite particles to form an article.

13. The method of claim 12, wherein the article is a ball, ball seat, or fracture plug.

14. The method of claim 9, further comprising dispersing a plurality of the composite particles in a matrix to form a composition.

15. The method of claim 14, wherein the matrix is non-metallic.

16. The method of claim 14, further comprising applying the composition to a surface to form a coating.

17. The method of claim 16, further comprising performing a controlled electrolytic process on the coating in the presence of water and an electrolyte.

18. The method of claim 9, wherein the metallic layer and the shielding layer independently have a thickness of about 0.05 to about 0.15 μm.

19. The method of claim 9, wherein the composite particle comprises the adhesion metal layer deposited on the metallic layer, and wherein the adhesion metal layer comprises aluminum.

* * * * *